(12) United States Patent
Tadera et al.

(10) Patent No.: US 10,629,380 B2
(45) Date of Patent: Apr. 21, 2020

(54) CAPACITOR MODULE

(71) Applicant: Panasonic Intellectual Property Management Co., Ltd., Osaka (JP)

(72) Inventors: Shin Tadera, Toyama (JP); Takuya Inazumi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/190,375

(22) Filed: Nov. 14, 2018

(65) Prior Publication Data

US 2019/0080844 A1 Mar. 14, 2019

Related U.S. Application Data

(63) Continuation of application No. PCT/JP2017/018613, filed on May 18, 2017.

(30) Foreign Application Priority Data

May 31, 2016 (JP) .................................. 2016-108169

(51) Int. Cl.
*H01G 4/236* (2006.01)
*H01G 4/224* (2006.01)
(Continued)

(52) U.S. Cl.
CPC ............... *H01G 4/236* (2013.01); *H01G 2/04* (2013.01); *H01G 2/10* (2013.01); *H01G 4/224* (2013.01);
(Continued)

(58) Field of Classification Search
CPC .............. H01G 4/236; H01G 2/10; H01G 4/38
See application file for complete search history.

(56) References Cited

U.S. PATENT DOCUMENTS

| 9,947,467 | B2* | 4/2018 | Goodson | ................. H02H 9/005 |
| 2012/0008357 | A1* | 1/2012 | Azuma | ..................... B60K 6/48 |
| | | | | 363/131 |

(Continued)

FOREIGN PATENT DOCUMENTS

JP 62-184724 U 11/1987
JP 2000-286571 10/2000
(Continued)

OTHER PUBLICATIONS

International Search Report of PCT application No. PCT/JP2017/018613 dated Aug. 1, 2017.

*Primary Examiner* — William H. Mayo, III
*Assistant Examiner* — Hiram E Gonzalez
(74) *Attorney, Agent, or Firm* — McDermott Will & Emery LLP

(57) ABSTRACT

The capacitor module includes a capacitor, a relay substrate, a first connection terminal member, and a second connection terminal member. The capacitor includes a capacitor body, a first lead wire, and a second lead wire. The first lead wire and the second lead wire are drawn out from the capacitor body. The relay substrate includes a first conductive pattern and a second conductive pattern. The first conductive pattern is electrically connected with the first lead wire. And the second conductive pattern is electrically connected with the second lead wire. The first connection terminal member is electrically connected to the first conductive pattern. The first connection terminal member includes a first terminal part configured to be electrically connected to an external connector. The second connection terminal member is electrically connected to the second conductive pattern. The second connection terminal member includes a second terminal part configured to be electrically connected to an external connector.

9 Claims, 16 Drawing Sheets

(51) Int. Cl.
*H01G 4/33* (2006.01)
*H01G 4/38* (2006.01)
*H01G 4/228* (2006.01)
*H01G 2/10* (2006.01)
*H01G 2/04* (2006.01)

(52) U.S. Cl.
CPC ............... *H01G 4/228* (2013.01); *H01G 4/33* (2013.01); *H01G 4/38* (2013.01)

(56) References Cited

U.S. PATENT DOCUMENTS

2018/0342350 A1* 11/2018 Koyama .................. H01G 4/38
2019/0080850 A1* 3/2019 Inazumi ................. H01G 4/228

FOREIGN PATENT DOCUMENTS

| | | |
|---|---|---|
| JP | 2014-086628 | 5/2014 |
| JP | 2014-170882 | 9/2014 |

* cited by examiner

CAPACITOR MODULE

RELATED APPLICATIONS

This application is a continuation of the PCT International Application No. PCT/JP2017/018613 filed on May 18, 2017, which claims the benefit of foreign priority of Japanese patent application No. 2016-108169 filed on May 31, 2016, the contents all of which are incorporated herein by reference.

BACKGROUND

1. Technical Field

The present disclosure relates to a capacitor module.

2. Description of the Related Art

Conventionally, a capacitor that includes a capacitor body and a pair of lead wires (also called lead terminals) is known. The capacitor body is obtained by coating a capacitor element with an exterior body such as a powder resin, and the pair of lead wires are metal wires drawn out from the capacitor body. In many cases, such a capacitor is mounted on a printed board so as to constitute an electric circuit together with other electric components. In this process, the pair of lead wires are soldered to a conductive pattern formed on the printed board.

Such a capacitor is sometimes connected not to a conductive pattern formed on the printed board, but to a metal terminal plate provided on an electric circuit to which the capacitor is to be connected. In such a case, one option is to employ a configuration in which a pair of lead wires of a capacitor are directly soldered to a terminal member to be connected to a terminal plate of an electric circuit to which the capacitor is to be connected and the other end of the terminal member is connected to the terminal plate, as described in Unexamined Japanese Patent Publication No. 2000-286571.

SUMMARY

A capacitor module according to an aspect of the present disclosure includes a capacitor, a relay substrate, a first connection terminal member, and a second connection terminal member. The capacitor includes a capacitor body, a first lead wire, and a second lead wire. The first lead wire and the second lead wire are drawn out from the capacitor body. The relay substrate includes a first conductive pattern and a second conductive pattern. The first conductive pattern is electrically connected with the first lead wire. And the second conductive pattern is electrically connected with the second lead wire. The first connection terminal member is electrically connected to the first conductive pattern. The first connection terminal member includes a first terminal part configured to be electrically connected to an external connector. The second connection terminal member is electrically connected to the second conductive pattern. The second connection terminal member includes a second terminal part configured to be electrically connected to an external connector.

According to the present disclosure, it is possible to provide a capacitor module that makes it possible to connect a lead wire type capacitor to an external connector by using a connection terminal member while preventing heat from damaging the capacitor.

Effects or meanings of the present disclosure will be further clarified in the following description of the exemplary embodiments. However, the following exemplary embodiments are illustrative only for implementation of the present disclosure, and the present disclosure is not at all restrictive of the following exemplary embodiments.

DETAILED DESCRIPTION OF EMBODIMENT

Figure 1:
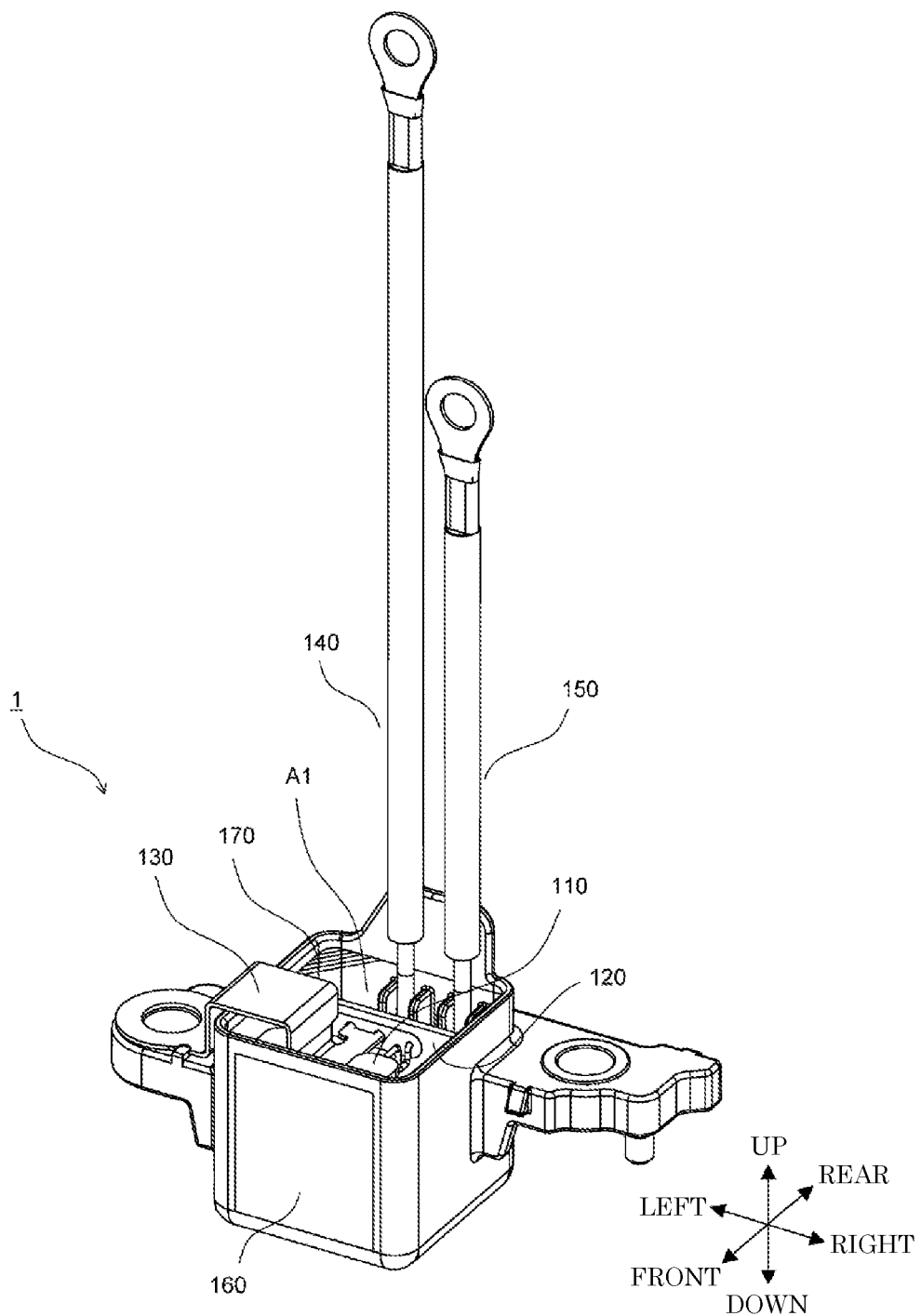
FIG. 1 is a front perspective view illustrating a capacitor module according to a first exemplary embodiment.

Prior to describing exemplary embodiments of the present disclosure, problems with a conventional capacitor are briefly described.

In a case where the configuration described in Unexamined Japanese Patent Publication No. 2000-286571 is employed, it is not easy to perform an operation of directly soldering an end of a lead wire of a capacitor and an end of a terminal member. And thus, it tends to take a long time to perform the soldering operation. As a result, heat generated by soldering transfers to the capacitor body through the lead wire. This tends to heat the capacitor body up to a high temperature, leading to a risk of damage of the capacitor.

In view of such a problem, the present disclosure provides a capacitor module that makes it possible to connect a lead wire type capacitor to an external connector by using a connection terminal member while preventing heat from damaging the capacitor.

First Exemplary Embodiment

Capacitor module 1 according to a first exemplary embodiment is described below with reference to FIGS. 1 to 8. For the sake of convenience, directions including front and rear, right and left, and up and down are added to the drawings as appropriate. These directions are not absolute directions but relative directions in relation to an orientation of capacitor module 1.

In the present exemplary embodiment, first lead wire 112 and second lead wire 113 are examples of a "first lead wire" and a "second lead wire" recited in the claims, respectively. First conductive pattern 121 is an example of a "first conductive pattern" recited in the claims, and second conductive pattern 122 and third conductive pattern 123 are examples of a "second conductive pattern" recited in the claims. First cutout groove 125 and second cutout groove 126 are examples of a "through-port" recited in the claims. Bus bar 130 is an example of a "first connection terminal member" recited in the claims. Connection terminal 134 is an example of a "first terminal part" recited in the claims. First harness 140 and second harness 150 are examples of a "second connection terminal member" recited in the claims Round crimp terminals 142 and 152 are examples of a "second terminal part" recited in the claims. Front face 161b, rear face 161c, left face 161d, and right face 161e are an example of "four side faces" recited in the claims First attachment tab 162 and second attachment tab 163 are examples of a "fixing part" recited in the claims First substrate holder 165 and second substrate holder 166 are examples of a "substrate position determiner" recited in the claims Bus bar holder 167 and engagement rib 162b are examples of a "first terminal position determiner" recited in the claims First harness holder 168 and second harness holder 169 are examples of a "second terminal position determiner" recited in the claims.

However, the above description purely defines correspondences between constituents recited in the claims and constituents described in the exemplary embodiment. These correspondences are not intended to limit the scope of the disclosure in the claims to the configuration described in the exemplary embodiment.

Figure 2:
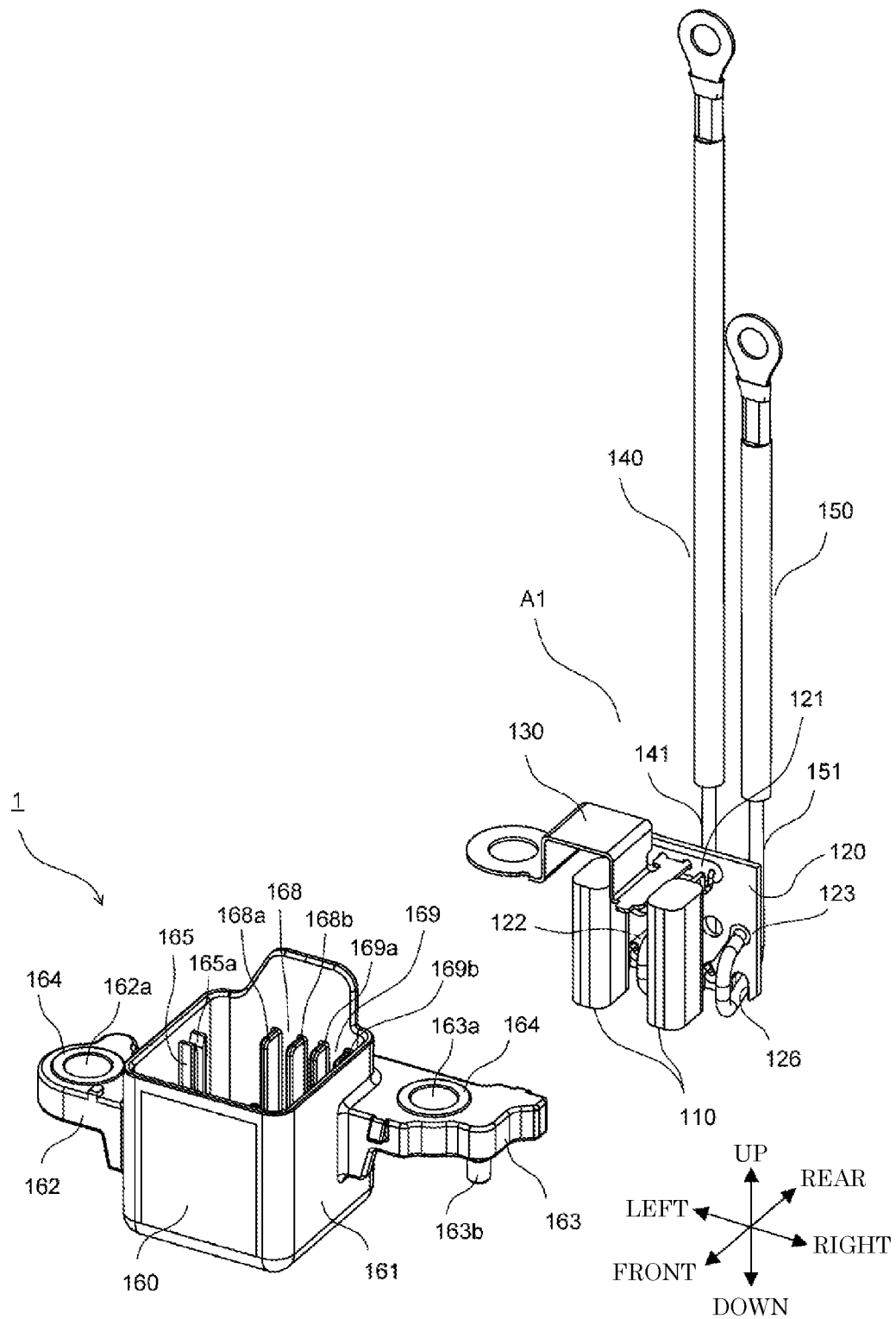
FIG. 2 is an exploded perspective view of a capacitor module illustrating a state before an assembly body is put into a case according to the first exemplary embodiment.
Figure 3:
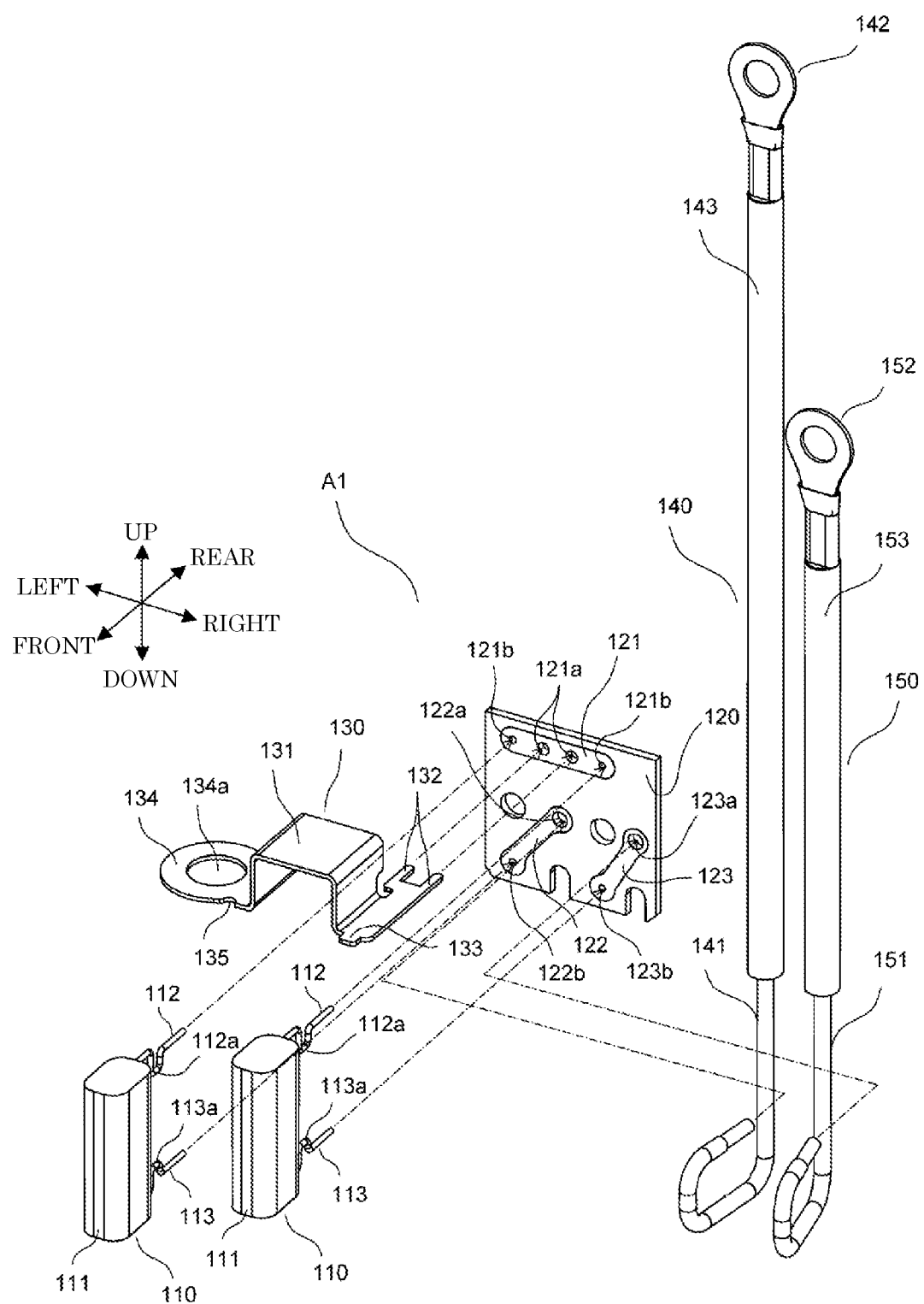
FIG. 3 is an exploded perspective view illustrating the assembly body according to the first exemplary embodiment.
Figure 4A:
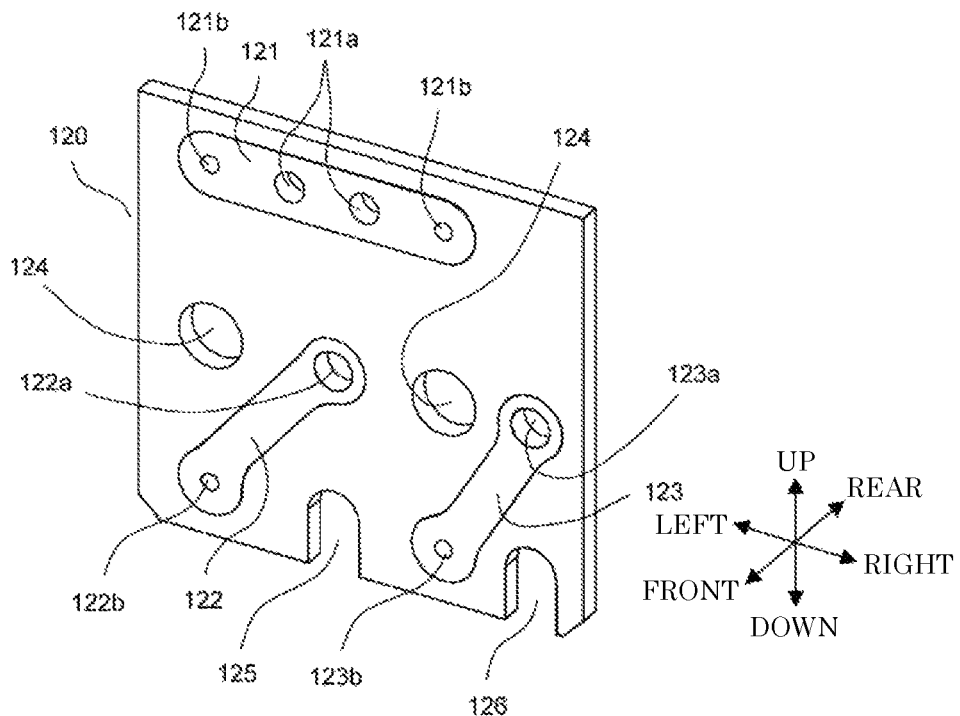
FIG. 4A is a front perspective view illustrating a relay substrate according to the first exemplary embodiment.
Figure 4B:
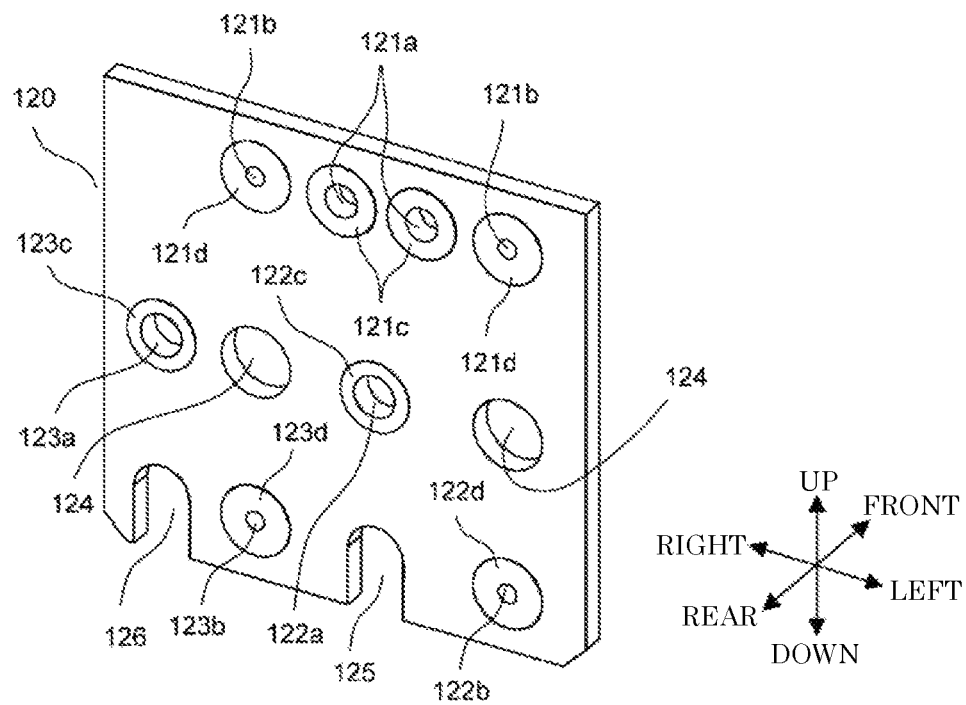
FIG. 4B is a rear perspective view illustrating the relay substrate according to the first exemplary embodiment.
Figure 5A:
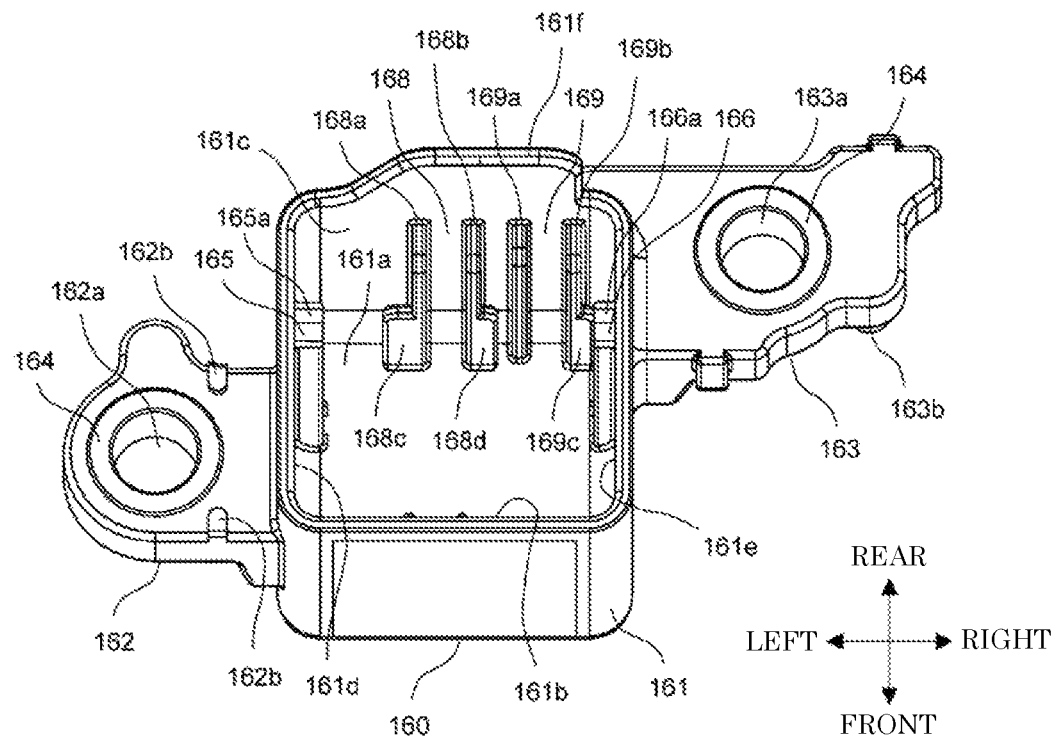
FIG. 5A is a perspective view illustrating the case viewed from above on a front side according to the first exemplary embodiment.
Figure 5B:
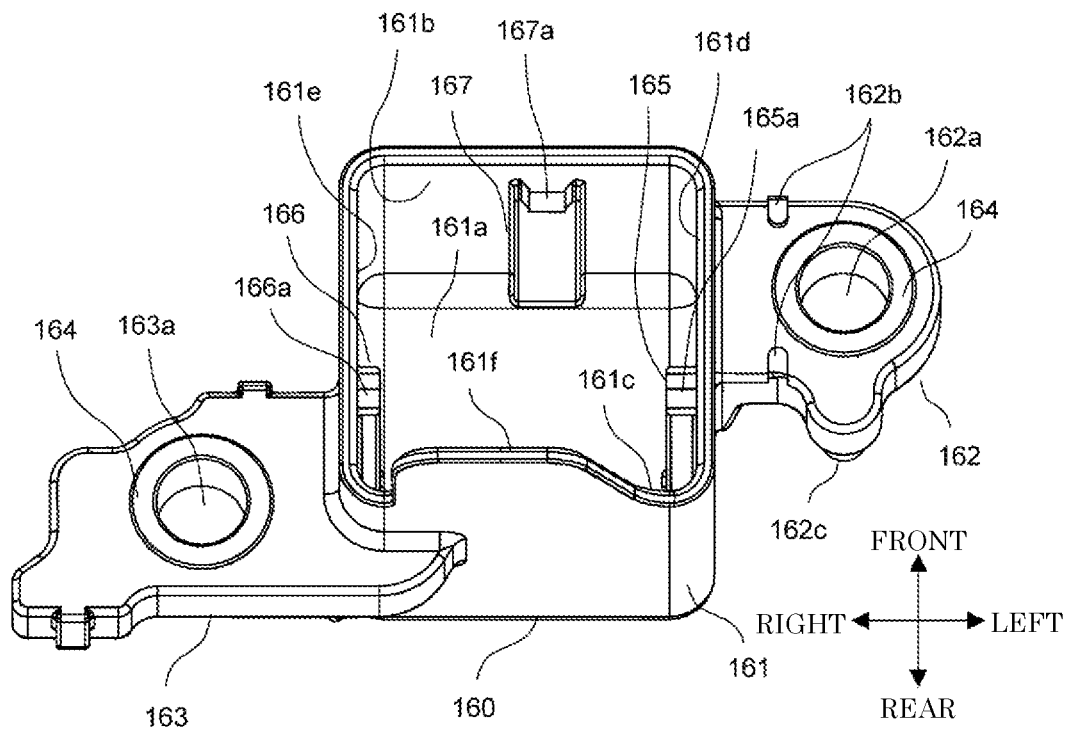
FIG. 5B is a perspective view illustrating the case viewed from above on a rear side according to the first exemplary embodiment.
Figure 6:
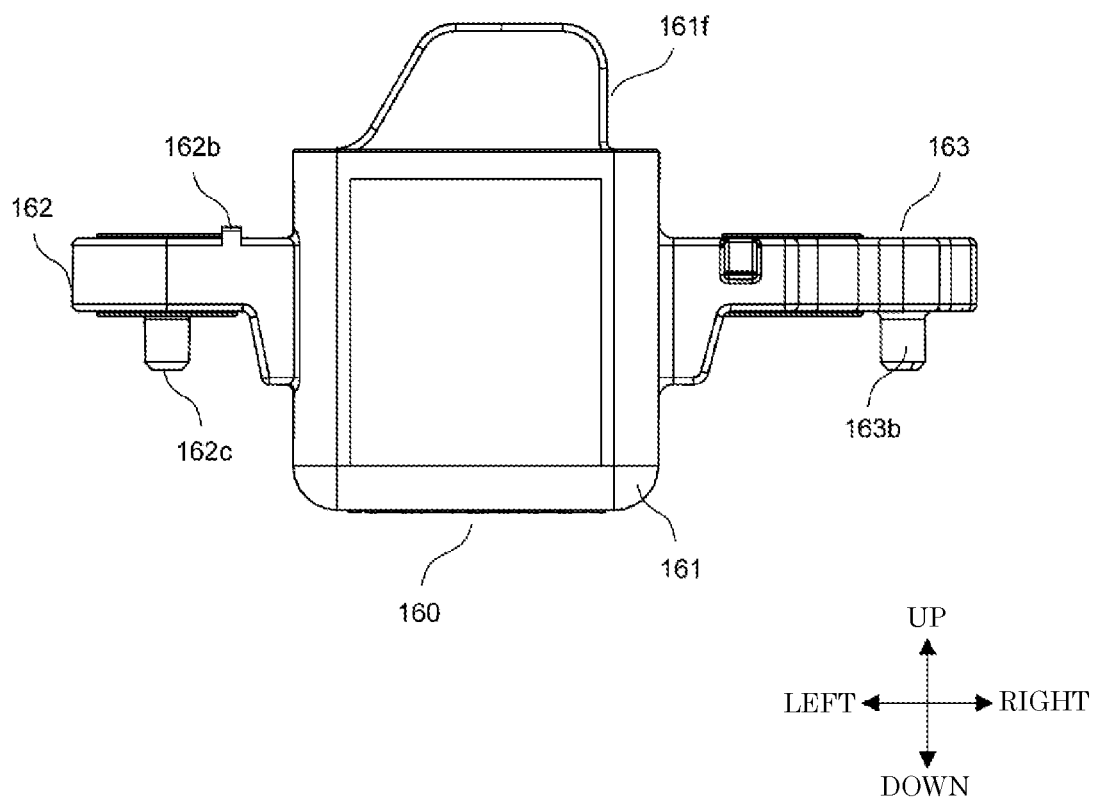
FIG. 6 is a front view illustrating a case according to the first exemplary embodiment.
Figure 7:
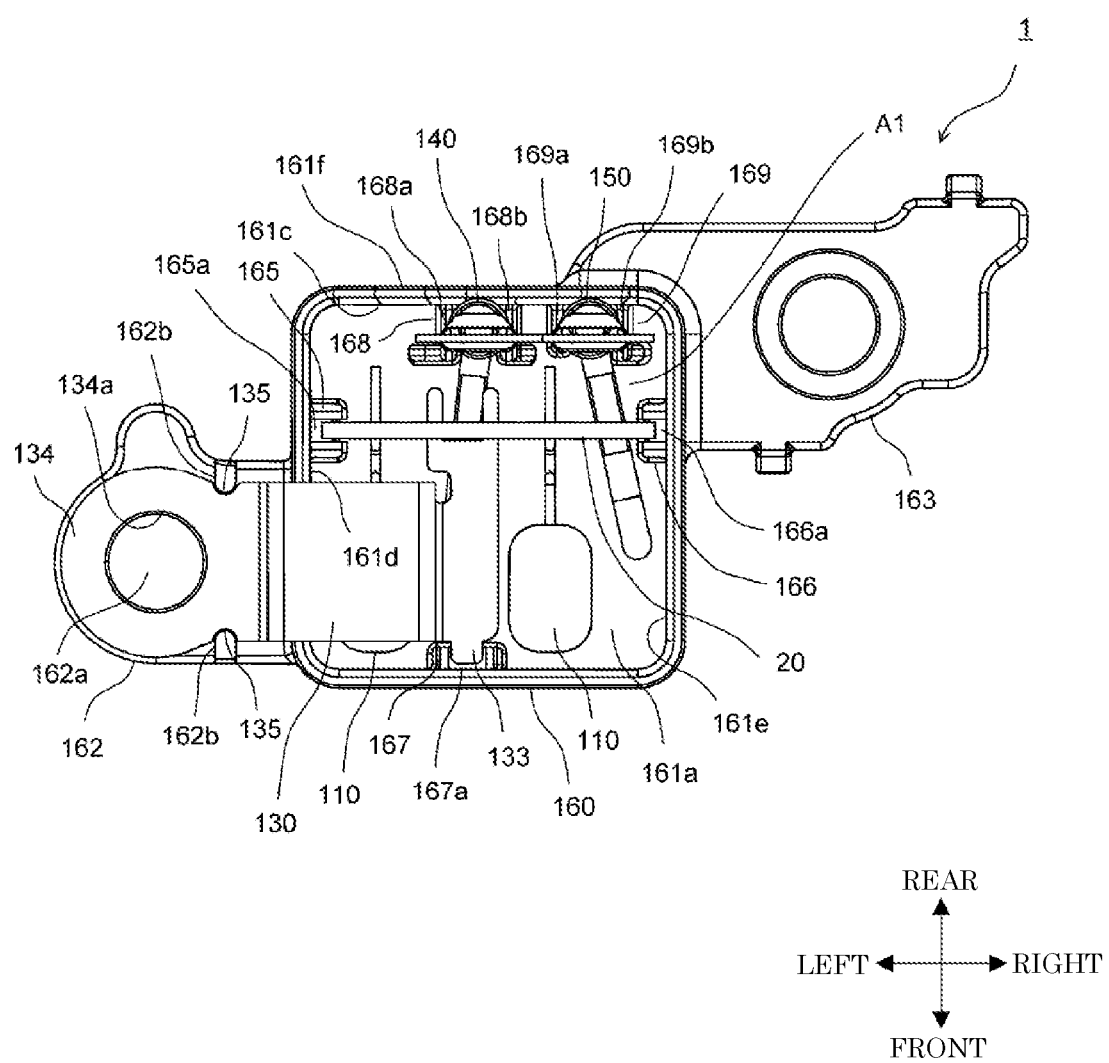
FIG. 7 is a plan view of the capacitor module illustrating a state before a case is filled with a filling resin according to the first exemplary embodiment.
Figure 8:
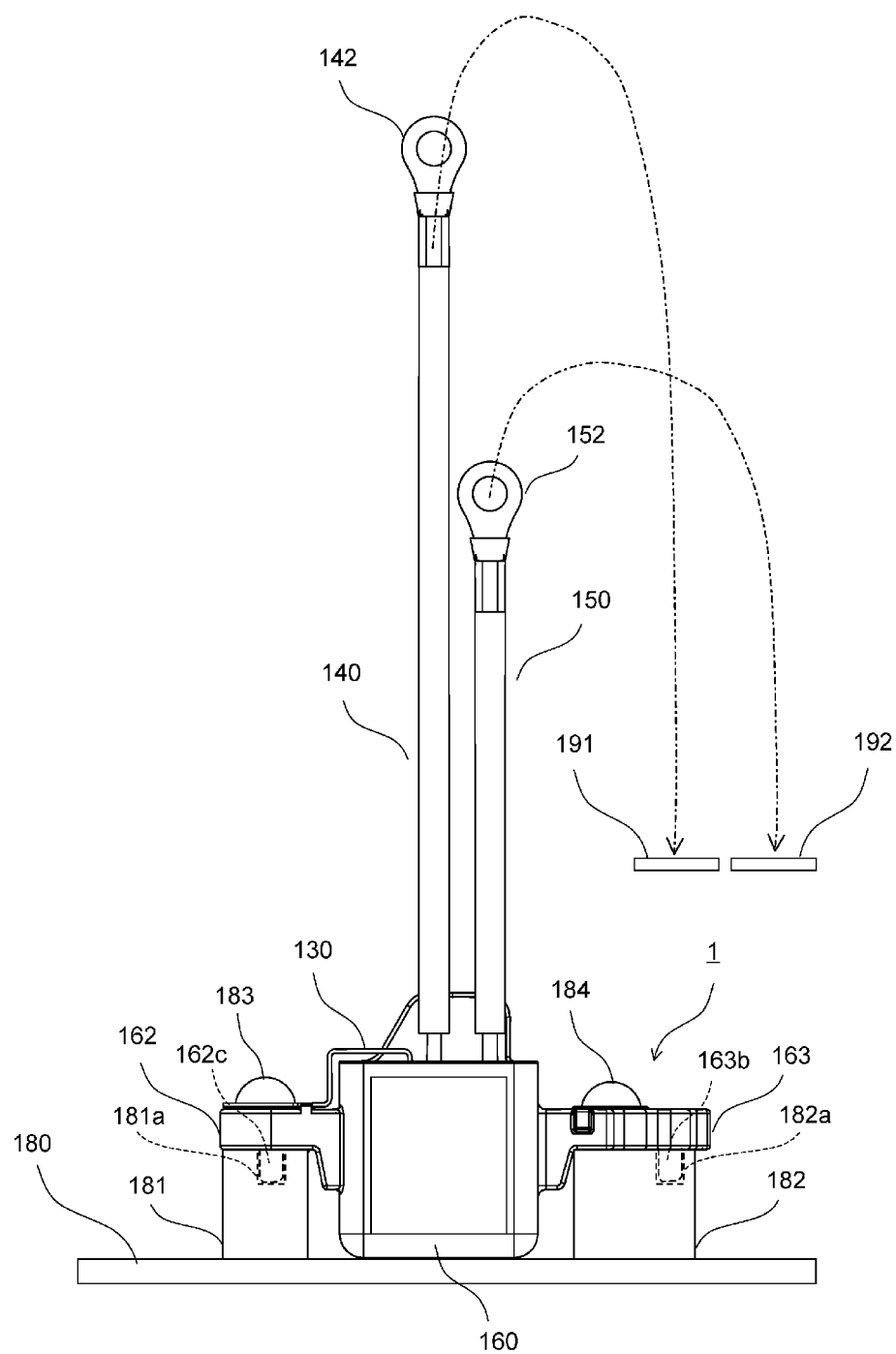
FIG. 8 illustrates a state in which the capacitor module has been attached to an external attachment member according to the first exemplary embodiment.

FIG. 1 is a front perspective view illustrating capacitor module 1 according to the first exemplary embodiment. FIG. 2 is an exploded perspective view of capacitor module 1 illustrating a state before assembly body A1 is put into case 160 according to the first exemplary embodiment. FIG. 3 is an exploded perspective view illustrating assembly body A1 according to the first exemplary embodiment. FIG. 4A is a front perspective view illustrating relay substrate 120 according to the first exemplary embodiment, and FIG. 4B is a rear perspective view illustrating relay substrate 120 according to the first exemplary embodiment. FIG. 5A is a perspective view illustrating case 160 viewed from above on a front side according to the first exemplary embodiment, and FIG. 5B is a perspective view illustrating case 160 viewed from above on a rear side according to the first exemplary embodiment. FIG. 6 is a front view illustrating case 160 according to the first exemplary embodiment. FIG. 7 is a plan view of capacitor module 1 illustrating a state before case 160 is filled with filling resin 170 according to the first exemplary embodiment. FIG. 8 illustrates a state in which capacitor module 1 has been attached to external attachment member 180 according to the first exemplary embodiment.

In FIG. 1, a part of filling resin 170 is hatched, and the remaining part is transparent, for the sake of convenience.

Capacitor module 1 includes two capacitors 110, relay substrate 120, bus bar 130, first harness 140, and second harness 150. Furthermore, capacitor module 1 includes case 160 into which assembly body A1 is put. Assembly body A1 is obtained by assembling capacitors 110, relay substrate 120, bus bar 130, first harness 140, and second harness 150. And case 160 is filled with filling resin 170.

Each of capacitors 110 includes capacitor body 111 obtained by coating a capacitor element with an external body such as a powder resin, and first lead wire 112 and second lead wire 113. First lead wire 112 and second lead wire 113 are connected to electrodes at both ends of the capacitor element, respectively and are drawn out from capacitor body 111. Each of capacitors 110 can be, for example, a film capacitor. In this case, the capacitor element is formed, for example, by vapor-depositing aluminum on dielectric films to form two metalized films, by overlaying the metalized films on each other, by winding or laminating the metalized films, and by pressing the metalized films into a flat shape. First lead wire 112 and second lead wire 113 are formed, for example, by plating a metal wire such as a copper wire with tin or the like. U-shaped bent parts 112a and 113a protruding inward are provided in middles of lead wires 112 and 113, respectively.

Relay substrate 120 has a substantially quadrangular shape, and dimensions in an up-down direction and a left-right direction are slightly smaller than inner dimensions in the up-down direction and the left-right direction of case 160. First conductive pattern 121, second conductive pattern 122, and third conductive pattern 123 that are made of a metal foil such as a copper foil are provided on a front face of relay substrate 120.

First conductive pattern 121 extends in the left-right direction in an upper part of relay substrate 120. First conductive pattern 121 has two through-holes 121a for bus bar that are arranged side by side in a central part and through-holes 121b for capacitor that are arranged at both ends. Second conductive pattern 122 extends from a central part of relay substrate 120 obliquely downward to left. Second conductive pattern 122 has through-hole 122a for harness in an upper end part and through-hole 122b for capacitor in a lower end part. Third conductive pattern 123 extends from a central part on a right side of relay substrate 120 obliquely downward to left. Third conductive pattern 123 has through-hole 123a for harness in an upper end part and through-hole 123b for capacitor in a lower end part. Through-holes 121a for bus bar, through-holes 121b, 122b, and 123b for capacitor, and through-holes 122a and 123a for harness each include a metal foil such as a copper foil or metal plating such as copper plating that covers an inner circumferential surface of the hole.

On a rear face of relay substrate 120, lands 121c for bus bar, lands 121d, 122d, and 123d for capacitor, and lands 122c and 123c for harness that are made of a metal foil such as a copper foil are provided around through-holes 121*a* for bus bar, through-holes 121*b*, 122*b*, and 123*b* for capacitor, and through-holes 122*a* and 123*a* for harness, respectively. Lands 121*c* for bus bar and lands 121*d* for capacitor are electrically connected to first conductive pattern 121 through through-holes 121*a* for bus bar and through-holes 121*b* for capacitor, respectively. Land 122*c* for harness and land 122*d* for capacitor are electrically connected to second conductive pattern 122 through through-hole 122*a* for harness and through-hole 122*b* for capacitor, respectively. Land 123*c* for harness and land 123*d* for capacitor are electrically connected to third conductive pattern 123 through through-hole 123*a* for harness and through-hole 123*b* for capacitor, respectively.

Relay substrate 120 has round passage hole 124 on both left and right sides of through-hole 122*a* for harness. Furthermore, relay substrate 120 has first cutout groove 125 and second cutout groove 126 obtained by cutting out a lower end of relay substrate 120 in an inverse U shape directly below through-hole 122*a* for harness and through-hole 123*a* for harness, respectively.

Bus bar 130 is formed, for example, by cutting out a conductive material such as a copper plate as appropriate and then bending the conductive material thus cut out. Bus bar 130 has, in a central part, bent part 131 that is bent upward in a rectangular shape. Two terminal pins 132 are provided side by side in the left-right direction on a rear side of a base part of bus bar 130, and engagement piece 133 is provided on a front side of the base part of bus bar 130 so as to protrude forward. Furthermore, round connection terminal 134 having attachment hole 134*a* is provided at a front end of bus bar 130, and engagement groove 135 recessed inward is provided on front and rear sides of a base part of connection terminal 134.

First harness 140 includes insulation-coated conductive wire 141, round crimp terminal 142, and protection tube 143. Insulation-coated conductive wire 141 (hereinafter abbreviated as "conductive wire 141") is formed, for example, by coating a twisted wire made of a copper wire with a fluorine resin or the like. Round crimp terminal 142 is attached to an end of conductive wire 141 opposite to an end connected to relay substrate 120. Protection tube 143 protects conductive wire 141 from damage by covering a part of conductive wire 141 exposed from case 160. Second harness 150 has a configuration similar to first harness 140 and includes insulation-coated conductive wire 151 (hereinafter abbreviated as "conductive wire 151"), round crimp terminal 152, and protection tube 153. A length of second harness 150 is shorter than a length of first harness 140.

Case 160 is made of a resin material such as PPS and includes case body 161 that has a substantially rectangular parallelepiped box shape opened on an upper side, first attachment tab 162 provided on a left side of case body 161, and second attachment tab 163 provided on a right side of case body 161. Case body 161 has bottom face 161*a* having a quadrangular shape and four side faces, i.e., front face 161*b*, rear face 161*c*, left face 161*d*, and right face 161*e* that rise from bottom face 161*a*.

On an inner side of case body 161, first substrate holder 165 and second substrate holder 166 are provided on left face 161*d* and right face 161*e*, respectively. First substrate holder 165 and second substrate holder 166 have first insertion groove 165*a* and second insertion groove 166*a* extending in the up-down direction, respectively. A groove width of each of first insertion groove 165*a* and second insertion groove 166*a* is almost equal to a thickness of relay substrate 120. Furthermore, bus bar holder 167 extending in the up-down direction is provided on front face 161*b*. Bus bar holder 167 has, at an upper end, engagement recess 167*a* that corresponds to engagement piece 133 of bus bar 130. Furthermore, first harness holder 168 and second harness holder 169 are provided side by side in the left-right direction on rear face 161*c*. First harness holder 168 has a pair of left and right holding ribs 168*a* and 168*b* that extend in the up-down direction so as to face each other at an interval almost equal to a width of conductive wire 141 of first harness 140. Reinforcing ribs 168*c* and 168*d* for reinforcing holding ribs 168*a* and 168*b* are formed so as to be integral with lower parts of holding ribs 168*a* and 168*b*, respectively. Similarly, second harness holder 169 has a pair of left and right holding ribs 169*a* and 169*b* that extend in the up-down direction so as to face each other at an interval almost equal to a width of conductive wire 151 of second harness 150. Reinforcing rib 169*c* for reinforcing holding rib 169*b* is formed so as to be integral with a lower part of right holding rib 169*b*.

Rear face 161*c* of case body 161 has support 161*f* that extends upward so as to be continuous with an upper end of rear face 161*c*.

First attachment tab 162 has round attachment hole 162*a*. Collar 164 made of a metal is fitted in attachment hole 162*a* in order to increase a strength of the hole. On an upper face of first attachment tab 162, engagement rib 162*b* that protrudes upward is provided in a front end part and a rear end part that are closer to case body 161 than attachment hole 162*a*. On a lower face of first attachment tab 162, position determining pin 162*c* that protrudes downward is provided on a rear side of attachment hole 162*a*.

Second attachment tab 163 has round attachment hole 163*a*. Collar 164 is fitted in attachment hole 163*a* as in the case of attachment hole 162*a*. On a lower face of second attachment tab 163, position determining pin 163*b* that protrudes downward is provided on a right side of attachment hole 163*a*.

Filling resin 170 is a thermosetting resin and is, for example, an epoxy resin. Alternatively, filling resin 170 may be a urethane resin. As illustrated in FIG. 1, filling resin 170 covers main portions of assembly body A1, thereby protecting these main portions from external moisture and shock.

In a case where capacitor module 1 is assembled, first, assembly body A1 is assembled as illustrated in FIG. 2 by attaching two capacitors 110, bus bar 130, first harness 140, and second harness 150 to relay substrate 120. In this process, one of capacitors 110 is soldered to first conductive pattern 121 after inserting first lead wire 112 into left through-hole 121*b* for capacitor of first conductive pattern 121 to a position where first lead wire 112 is stopped by bent part 112*a*. Further, the one of capacitors 110 is soldered to second conductive pattern 122 after inserting second lead wire 113 into through-hole 122*b* for capacitor of second conductive pattern 122 to a position where second lead wire 113 is stopped by bent part 113*a*. Furthermore, the other one of capacitors 110 is soldered to first conductive pattern 121 after inserting first lead wire 112 into right through-hole 121*b* for capacitor of first conductive pattern 121 to a position where first lead wire 112 is stopped by bent part 112*a*. Further, the other one of capacitors 110 is soldered to third conductive pattern 123 after inserting second lead wire 113 into through-hole 123*b* for capacitor of third conductive pattern 123 to a position where second lead wire 113 is stopped by bent part 113*a*. Furthermore, bus bar 130 is soldered to first conductive pattern 121 after inserting two terminal pins 132 into two through-holes 121*a* for bus bar of first conductive pattern 121. Furthermore, first harness 140 is soldered to second conductive pattern 122 after inserting an end of conductive wire 141 into through-hole 122a for harness of second conductive pattern 122. Furthermore, second harness 150 is soldered to third conductive pattern 123 after inserting an end of conductive wire 151 into through-hole 123a for harness of third conductive pattern 123.

In this way, first lead wire 112 of one capacitor 110 and first lead wire 112 of other capacitor 110 are electrically connected to bus bar 130 through first conductive pattern 121. Furthermore, second lead wire 113 of one capacitor 110 is electrically connected to first harness 140 through second conductive pattern 122, and second lead wire 113 of other capacitor 110 is electrically connected to second harness 150 through third conductive pattern 123. First harness 140 and second harness 150 are drawn out to a rear side of relay substrate 120 through first cutout groove 125 and second cutout groove 126 of relay substrate 120, respectively.

Assembled assembly body A1 is inserted from above into case 160. In this process, a left end of relay substrate 120 is inserted into first insertion groove 165a of first substrate holder 165, and a right end of relay substrate 120 is inserted into second insertion groove 166b of second substrate holder 166, as illustrated in FIG. 7. This determines a position of relay substrate 120 relative to case 160, and relay substrate 120 is held in this state so as not to move in the front-rear direction and the left-right direction. Relay substrate 120 is stretched between left face 161d and right face 161e of case 160 and stands on bottom face 161a.

Engagement piece 133 of bus bar 130 is engaged with engagement recess 167a of bus bar holder 167, and two engagement grooves 135 of bus bar 130 are engaged with corresponding engagement ribs 162b of first attachment tab 162, respectively. This determines a position of bus bar 130 relative to case 160, and bus bar 130 is held in this state so as not to move in the front-rear direction and the left-right direction. Attachment hole 134a of connection terminal 134 of bus bar 130 is aligned with attachment hole 162a of first attachment tab 162.

Furthermore, first harness 140 is erected along rear face 161c of case 160 so as to be sandwiched between the pair of holding ribs 168a and 168b of first harness holder 168. This determines a position of first harness 140 relative to case 160, and first harness 140 is held in this state so as not to move in the left-right direction. Similarly, second harness 150 is erected along rear face 161c of case 160 so as to be sandwiched between the pair of holding ribs 169a and 169b of second harness holder 169. This determines a position of second harness 150 relative to case 160, and second harness 150 is held in this state so as not to move in the left-right direction. Since first harness holder 168 and second harness holder 169 are provided on rear face 161c that faces relay substrate 120, first harness 140 and second harness 150 are bent in the front-back direction between relay substrate 120 and rear face 161c, and therefore force expanding in the front-rear direction acts on harnesses 140 and 150. Since first harness 140 and second harness 150 are pressed against rear face 161c of case 160 by this force, first harness 140 and second harness 150 are unlikely to be detached forward from first harness holder 168 and second harness holder 169. First harness 140 is drawn out upward from case 160 at a position of first harness holder 168, and second harness 150 is drawn out upward from case 160 at a position of second harness holder 169. Rear sides of first harness 140 and second harness 150 thus drawn out are supported by support 161f.

After assembly body A1 is placed in case 160, filling resin 170 in a liquid form is poured into case 160. Filling resin 170 is poured into case 160 until two capacitors 110 and relay substrate 120 are immersed in filling resin 170. In this process, since relay substrate 120 has two passage holes 124, first cutout groove 125, and second cutout groove 126, filling resin 170 poured into one of two spaces in case 160 partitioned by relay substrate 120 can flow into the other one of the two spaces through passage holes 124, first cutout groove 125, and second cutout groove 126. This allows filling resin 170 to smoothly spread to every part of case 160.

After case 160 is filled with filling resin 170, case 160 is heated. This cures filling resin 170 in liquid form. Capacitor module 1 is completed in this way. In case 160, assembly body A1 is fixed by cured filling resin 170 and does not come out from case 160 upward.

Capacitor module 1 is mounted in an apparatus, a vehicle, or the like. When capacitor module 1 is mounted in an apparatus, a vehicle, or the like, capacitor module 1 is, for example, attached to attachment member 180 prepared on the apparatus, the vehicle, or the like as illustrated in FIG. 8. Attachment member 180 is made of a metal such as aluminum and has first attachment boss 181 and second attachment boss 182. Capacitor module 1 is fixed to attachment member 180 by attaching first attachment tab 162 to first attachment boss 181 by using screw 183 and attaching second attachment tab 163 to second attachment boss 182 by using screw 184. In this process, position determining pin 162c of first attachment tab 162 is inserted into position determining hole 181a of first attachment boss 181, and position determining pin 163b of second attachment tab 163 is inserted into position determining hole 182a of second attachment boss 182, and thus capacitor module 1 is fixed to attachment member 180 in a proper direction.

Bus bar 130 is electrically connected to first attachment boss 181 through screw 184. Meanwhile, round crimp terminals 142 and 152 of first harness 140 and second harness 150 are electrically connected to connection terminals 191 and 192 of an electric circuit part such as an inverter circuit or a power source circuit that is disposed separately from attachment member 180.

Effects of First Exemplary Embodiment

The first exemplary embodiment described above achieves the following effects.

In the present exemplary embodiment, first lead wire 112 of each capacitor 110 is electrically connected to bus bar 130 through first conductive pattern 121 of relay substrate 120, and second lead wire 113 of each capacitor 110 is electrically connected to first harness 140 (second harness 150) through second conductive pattern 122 (third conductive pattern 123). Soldering of first lead wire 112 and second lead wire 113 to first conductive pattern 121 and second conductive pattern 122 (third conductive pattern 123) is similar to general soldering of a capacitor to a printed board and is easier than a case where first lead wire 112 and second lead wire 113 are directly soldered to bus bar 130 and first harness 140 (second harness 150). Since soldering does not take a long time, capacitor body 111 is unlikely to be heated to a high temperature by heat generated by soldering. It is therefore possible to electrically connect lead wire (lead terminal) type capacitors 110 to a connector such as an external connection terminal by using bus bar 130 and first harness 140 (second harness 150) while suppressing damage caused by heat.

Assembly body A1 obtained by assembling capacitors 110, relay substrate 120, bus bar 130, and first harness 140 (second harness 150) is put into case 160, and thus positions of relay substrate 120, bus bar 130, and first harness 140 (second harness 150) are determined relative to case 160. This allows bus bar 130 and first harness 140 (second harness 150) to be precisely drawn out from the determined positions in case 160, and therefore bus bar 130 and first harness 140 (second harness 150) can be precisely disposed at determined positions in a place (e.g., an apparatus or a vehicle) in which capacitor module 1 is installed by attaching case 160 at a proper position in this place. This makes it possible to smoothly connect bus bar 130 and first harness 140 (second harness 150) to a connector such as a connection terminal provided in the place. Furthermore, it is possible to prevent bus bar 130 and first harness 140 (second harness 150) from interfering with other components provide in the place.

Since first harness holder 168 (second harness holder 169) has a structure such that first harness 140 (second harness 150) is sandwiched between two holding ribs 168a and 168b (169a and 169b), first harness 140 (second harness 150) can be easily attached to first harness holder 168 (second harness holder 169) when assembly body A1 is put into case 160. Furthermore, since first harness holder 168 (second harness holder 169) is provided on rear face 161c that faces relay substrate 120 in case 160, expanding force acts on first harness 140 (second harness 150) that is bent between relay substrate 120 and rear face 161c, and first harness 140 (second harness 150) is pressed against rear face 161c by this force. Accordingly, first harness 140 (second harness 150) is unlikely to be detached from first harness holder 168 (second harness holder 169).

Furthermore, first harness 140 (second harness 150) is connected to second conductive pattern 122 (third conductive pattern 123) on a front face side of relay substrate 120 that does not face first harness holder 168 (second harness holder 169), and a part of first harness 140 (second harness 150) leading to first harness holder 168 (second harness holder 169) is passed through first cutout groove 125 (second cutout groove 126) formed in relay substrate 120. This allows movement of first harness 140 (second harness 150) to be regulated by first cutout groove 125 (second cutout groove 126), thereby making it hard for first harness 140 (second harness 150) to move in case 160.

Since relay substrate 120 has passage holes 124 through which filling resin 170 passes, filling resin 170 poured into one of spaces of case 160 partitioned by relay substrate 120 can be smoothly delivered to the other space.

Second Exemplary Embodiment

Capacitor module 2 according to a second exemplary embodiment is described below with reference to FIGS. 9 to 16. For the sake of convenience, directions including front and rear, right and left, and up and down are added to the drawings as appropriate. These directions are not absolute directions but relative directions in relation to an orientation of capacitor module 2.

In the present exemplary embodiment, first lead wire 212 and second lead wire 213 are examples of a "first lead wire" and a "second lead wire" recited in the claims, respectively. First conductive pattern 221 is an example of a "first conductive pattern" recited in the claims, and second conductive pattern 222 and third conductive pattern 223 are examples of a "second conductive pattern" recited in the claims Cutout groove 225 is an example of a "through-port" recited in the claims First bus bar 230 is an example of a "first connection terminal member" recited in the claims. Connection terminal 234 is an example of a "first terminal part" recited in the claims. Second bus bar 240 and third bus bar 250 are examples of a "second connection terminal member" recited in the claims. Connection terminals 244 and 257 are examples of a "second terminal part" recited in the claims. First harness 260 and second harness 270 are examples of a "third connection terminal member" recited in the claims Round crimp terminals 262 and 272 are examples of a "third terminal part" recited in the claims. First attachment tab 282 and second attachment tab 283 are examples of a "fixing part" recited in the claims First substrate holder 285 and second substrate holder 286 are examples of a "substrate position determiner" recited in the claims. Engagement ribs 282b are an example of a "first terminal position determiner" recited in the claims First engagement recess 287 and second engagement recess 288 are examples of a "second terminal position determiner" recited in the claims. First harness holder 255 and second harness holder 256 are examples of a "third terminal position determiner" recited in the claims.

However, the above description purely defines correspondences between constituents recited in the claims and constituents described in the exemplary embodiment. These correspondences are not intended to limit the scope of the disclosure in the claims to the configuration described in the exemplary embodiment.

Figure 9:
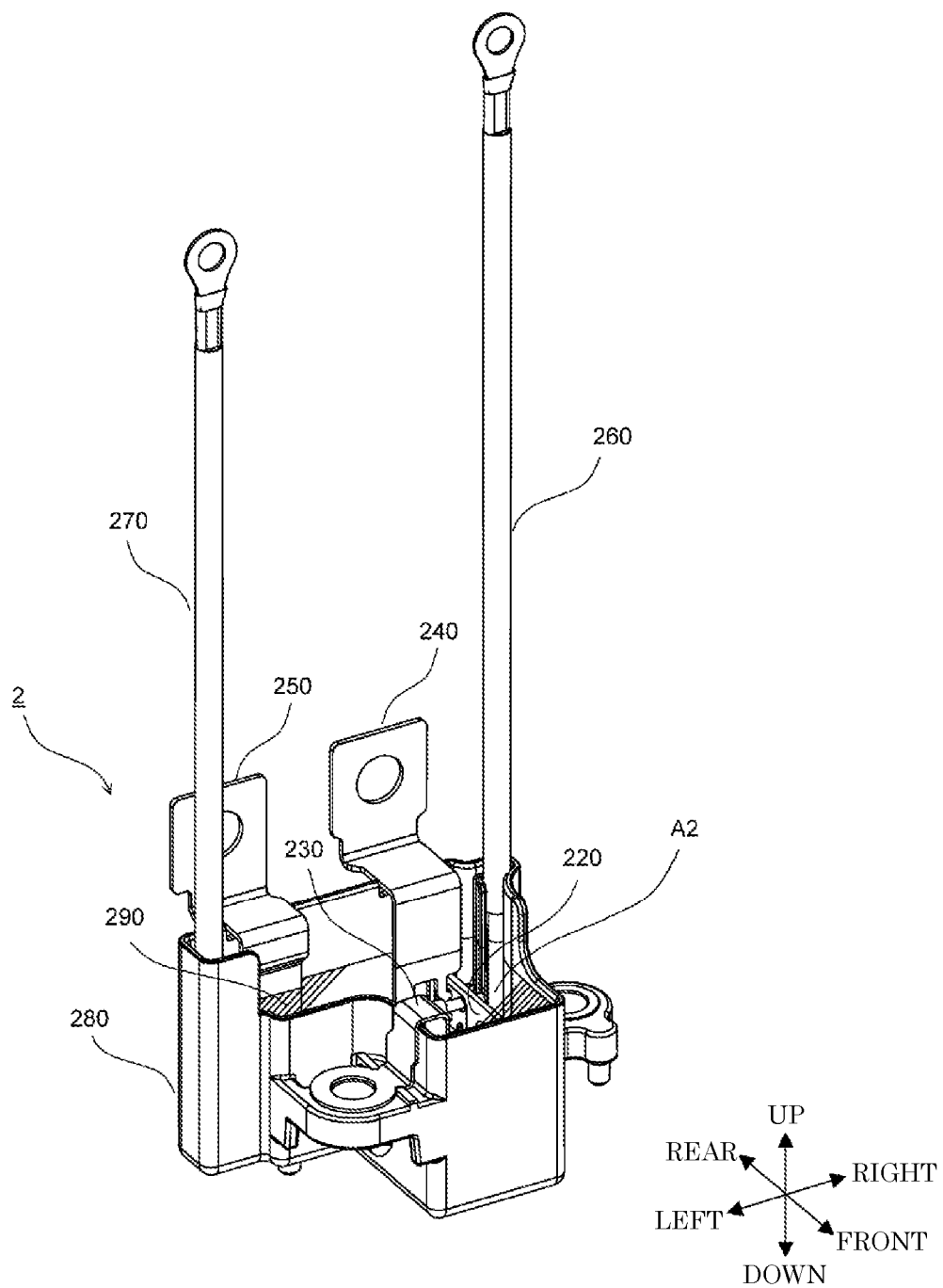
FIG. 9 is a front perspective view illustrating a capacitor module according to a second exemplary embodiment.
Figure 10:
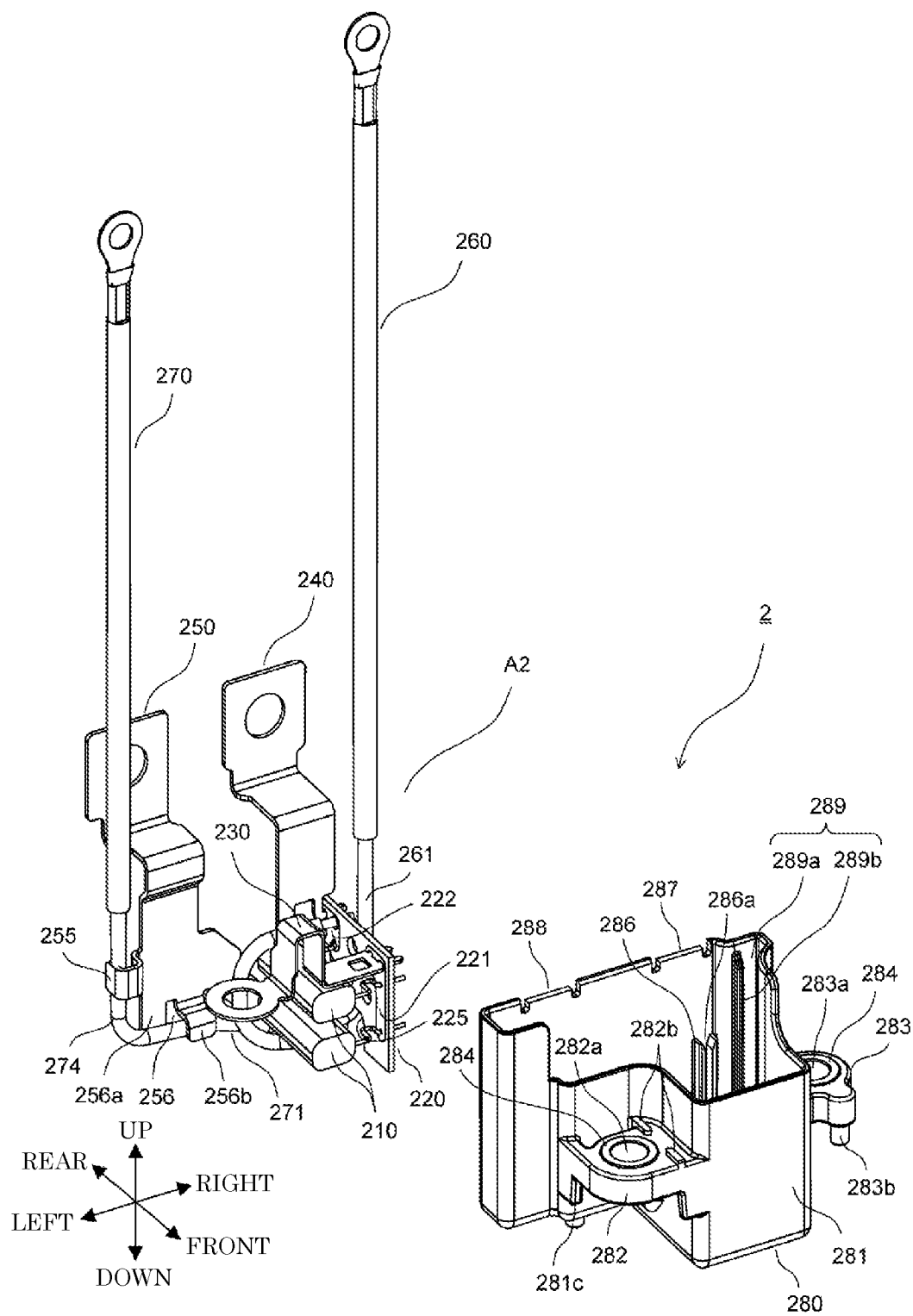
FIG. 10 is an exploded perspective view of the capacitor module illustrating a state before an assembly body is put into a case according to the second exemplary embodiment.
Figure 11:
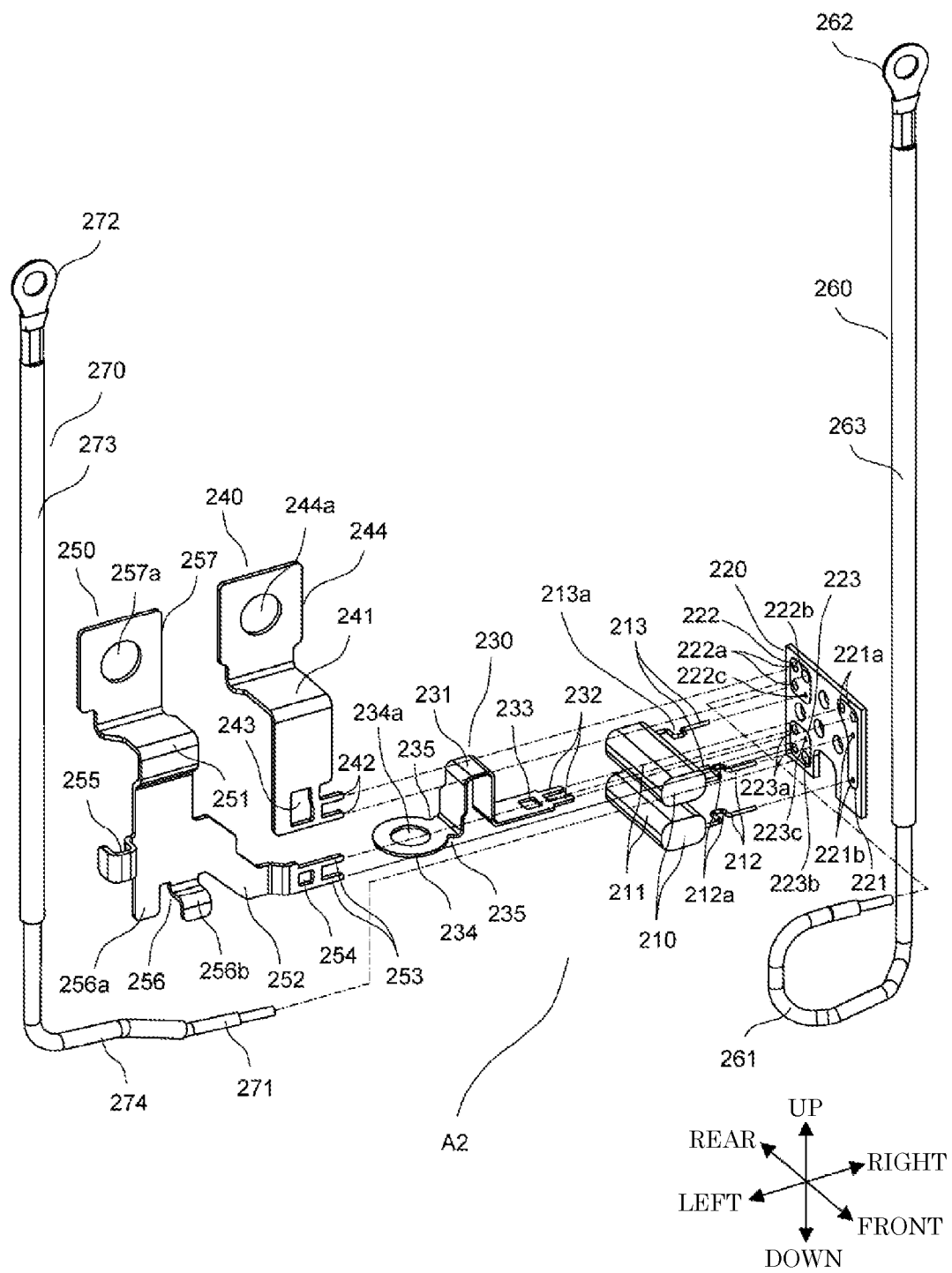
FIG. 11 is an exploded perspective view illustrating the assembly body according to the second exemplary embodiment.
Figure 12A:
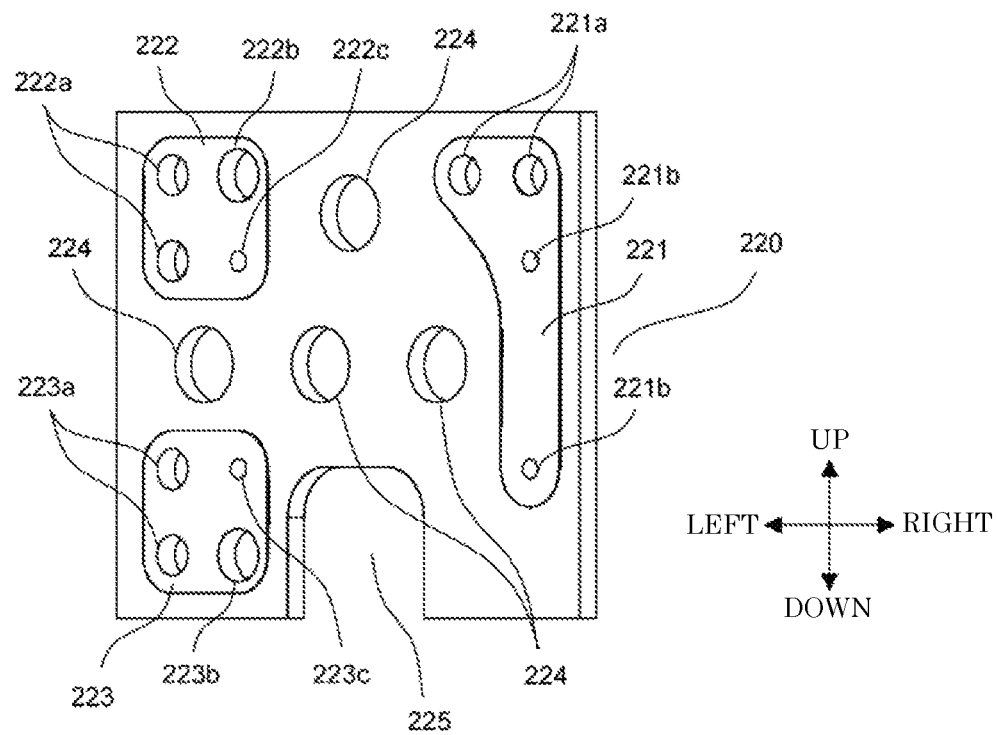
FIG. 12A is a front perspective view illustrating a relay substrate according to the second exemplary embodiment.
Figure 12B:
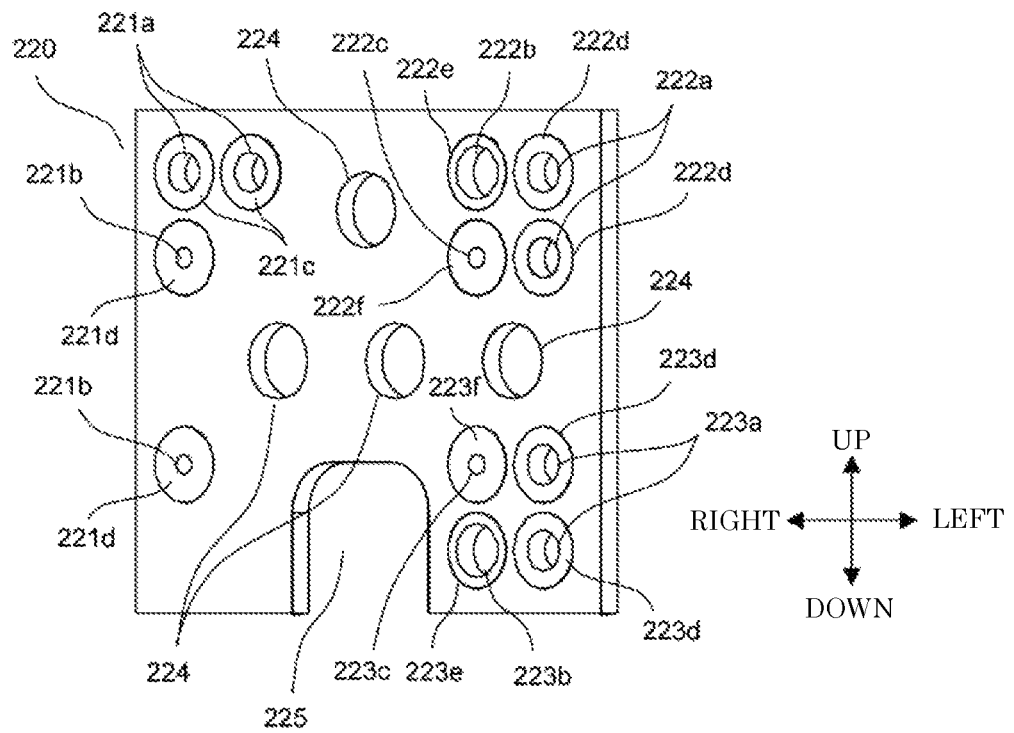
FIG. 12B is a rear perspective view illustrating the relay substrate according to the second exemplary embodiment.
Figure 13A:
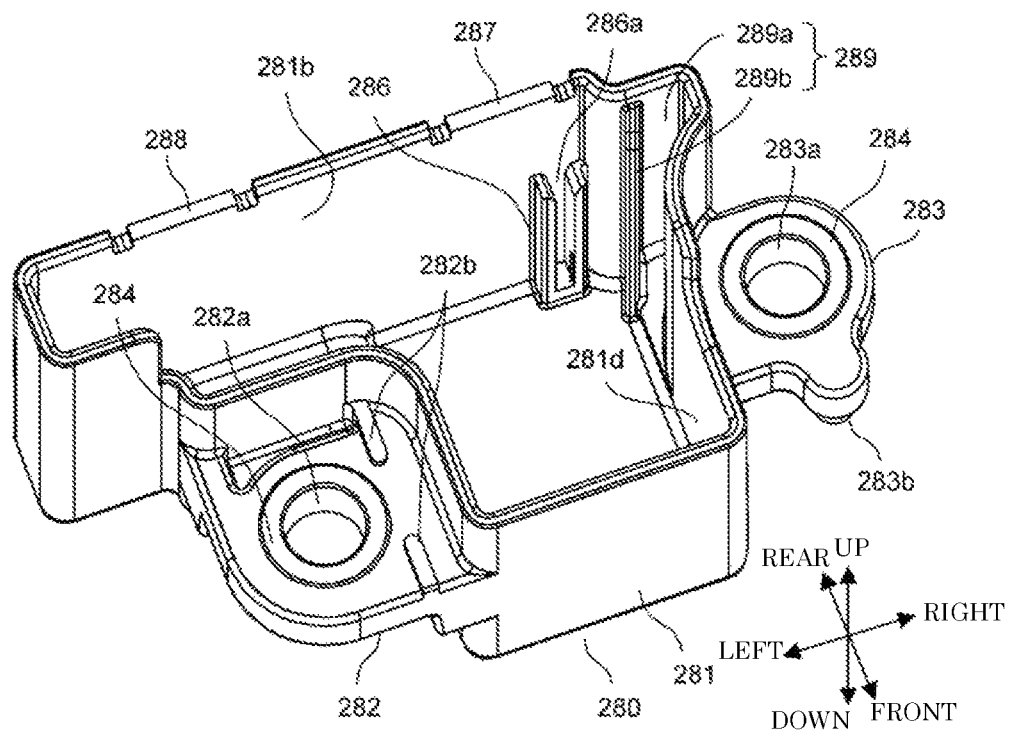
FIG. 13A is a front perspective view illustrating the case according to the second exemplary embodiment.
Figure 13B:
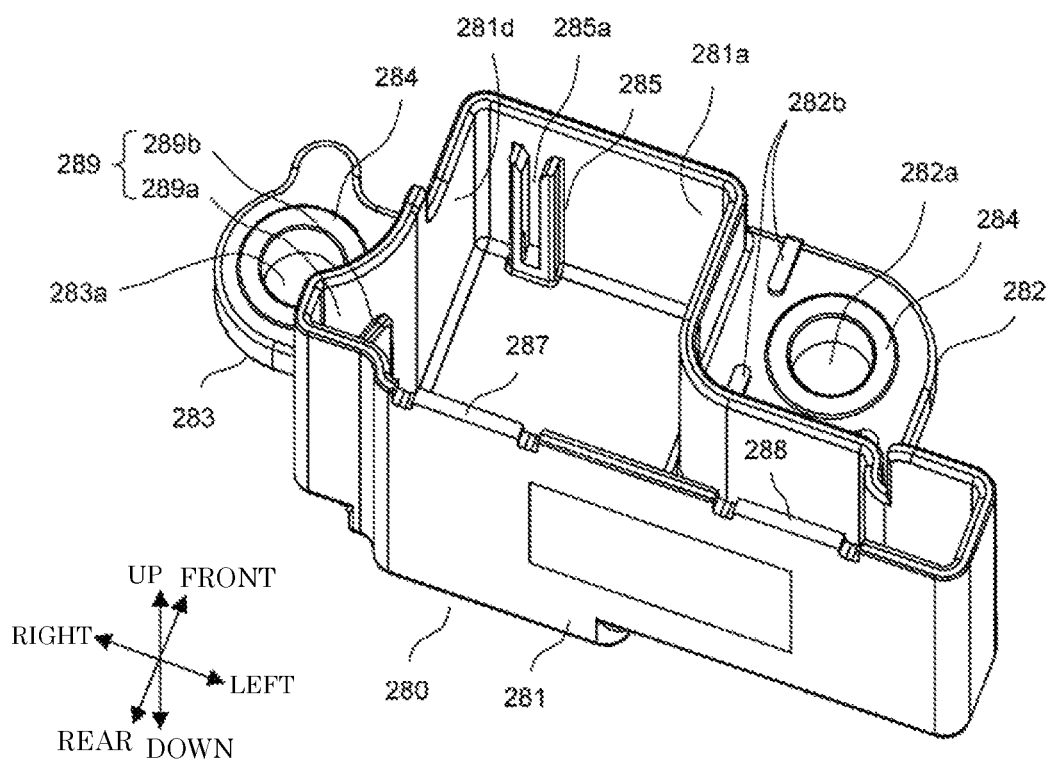
FIG. 13B is a rear perspective view illustrating the case according to the second exemplary embodiment.
Figure 14:
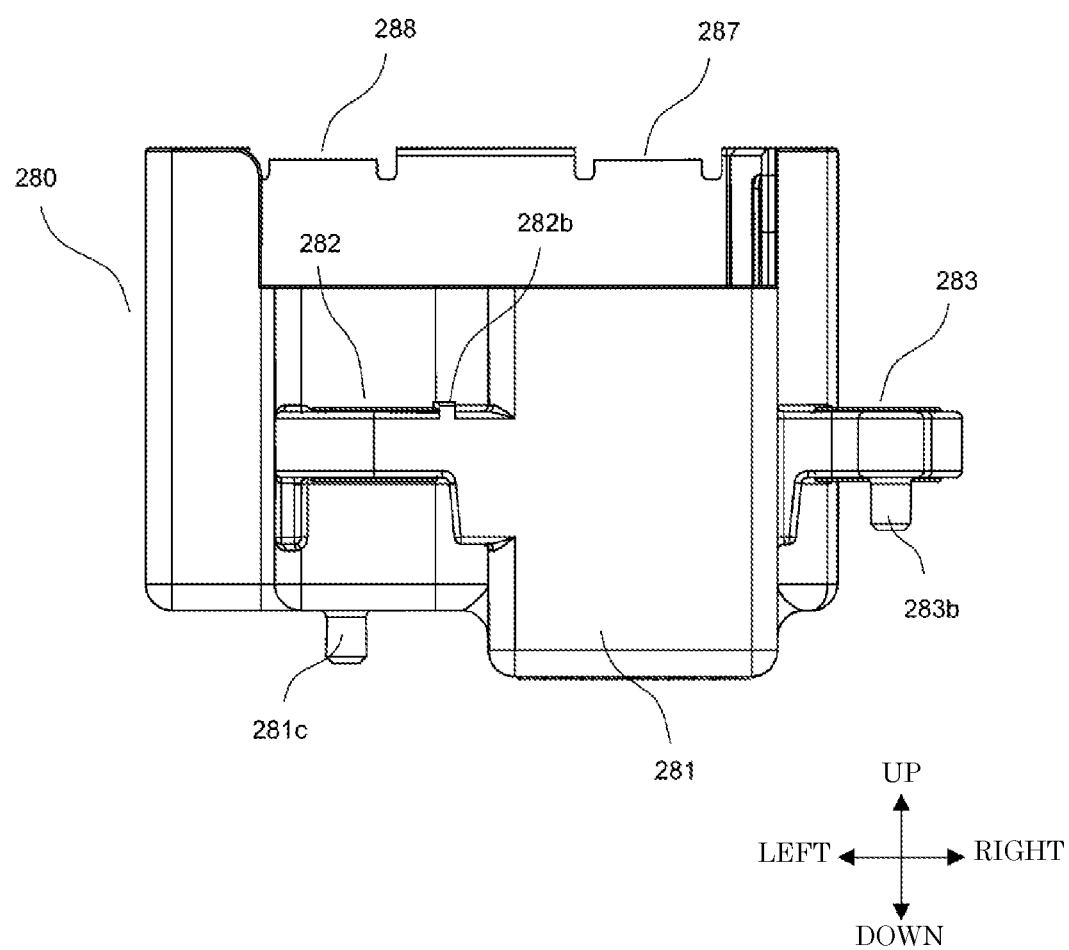
FIG. 14 is a front view illustrating the case according to the second exemplary embodiment.
Figure 15:
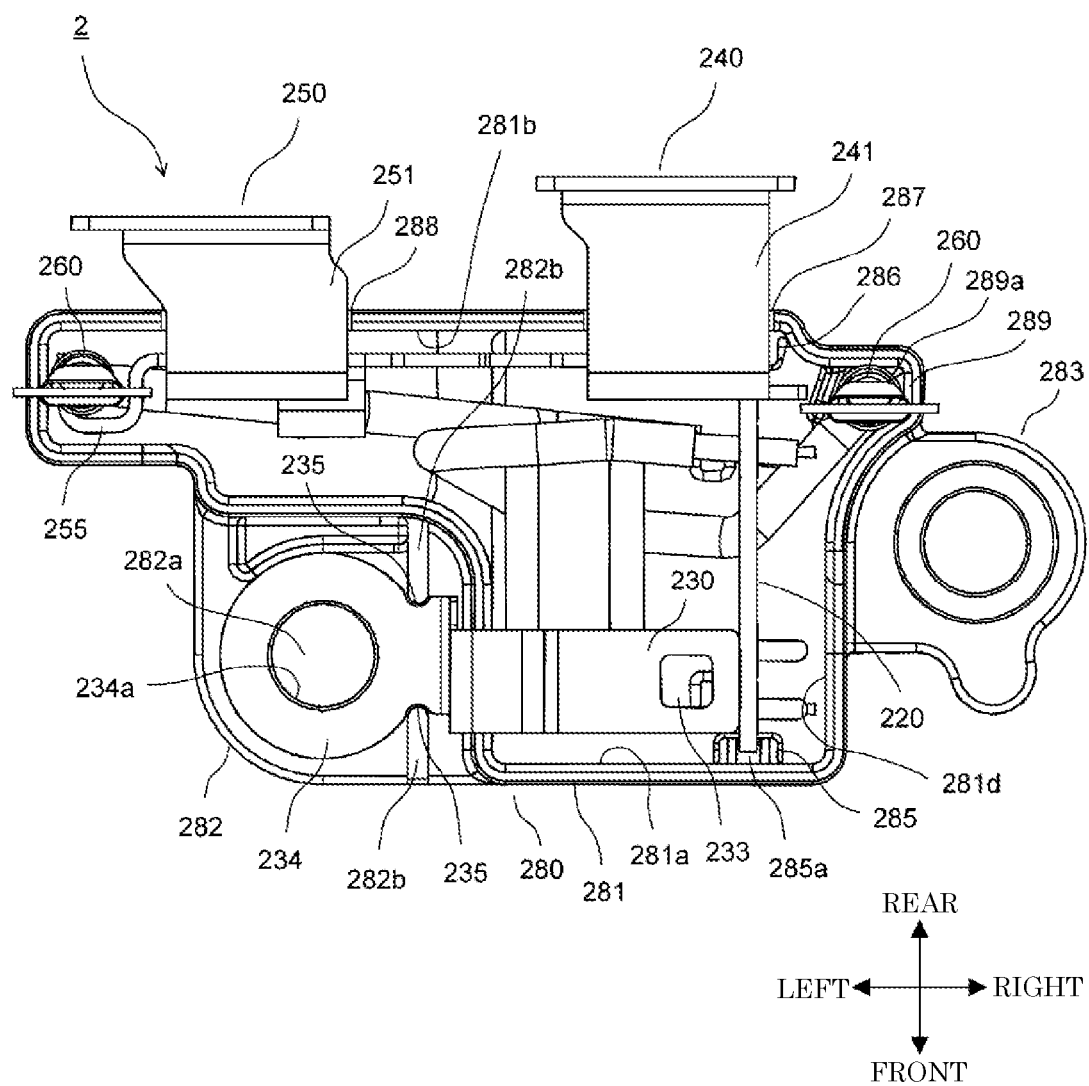
FIG. 15 is a plan view of the capacitor module illustrating a state before a case is filled with a filling resin according to the second exemplary embodiment.
Figure 16:
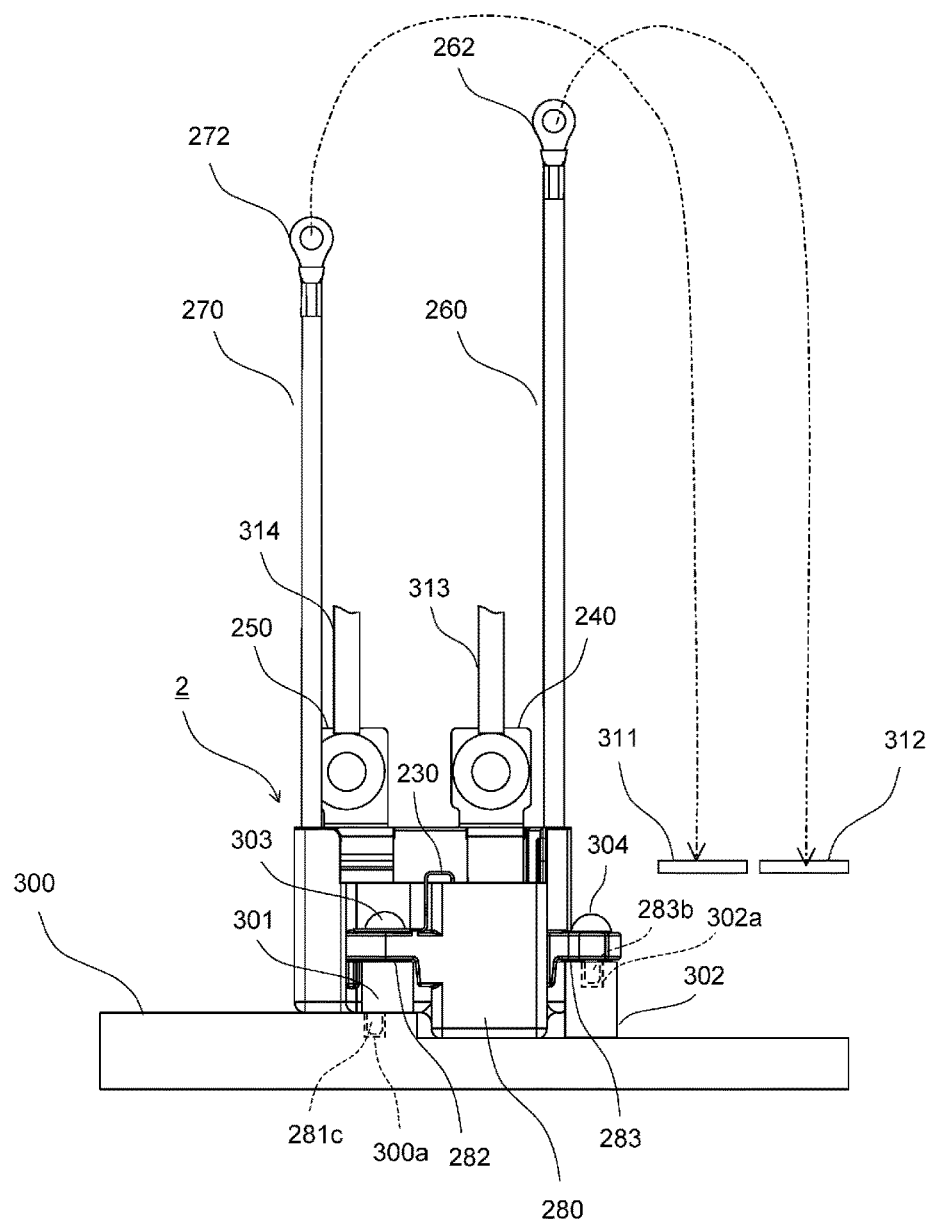
FIG. 16 illustrates a state in which the capacitor module has been attached to an external attachment member according to the second exemplary embodiment.

FIG. 9 is a front perspective view illustrating capacitor module 2 according to the second exemplary embodiment. FIG. 10 is an exploded perspective view of capacitor module 2 illustrating a state before assembly body A2 is put into case 280 according to the second exemplary embodiment. FIG. 11 is an exploded perspective view illustrating assembly body A2 according to the second exemplary embodiment. FIG. 12A is a front perspective view illustrating relay substrate 220 according to the second exemplary embodiment, and FIG. 12B is a rear perspective view illustrating relay substrate 220 according to the second exemplary embodiment. FIG. 13A is a front perspective view illustrating case 280 according to the second exemplary embodiment, and FIG. 13B is a rear perspective view illustrating case 280 according to the second exemplary embodiment. FIG. 14 is a front view illustrating case 280 according to the second exemplary embodiment. FIG. 15 is a plan view of capacitor module 2 illustrating a state before case 280 is filled with filling resin 290 according to the second exemplary embodiment. FIG. 16 illustrates a state in which capacitor module 2 has been attached to external attachment member 300 according to the second exemplary embodiment.

In FIG. 9, a part of filling resin 290 is hatched, and the remaining part is transparent, for the sake of convenience.

Capacitor module 2 includes two capacitors 210, relay substrate 220, first bus bar 230, second bus bar 240, third bus bar 250, first harness 260, and second harness 270. Furthermore, capacitor module 2 includes case 280 into which assembly body A2 is put. Assembly body A2 is obtained by assembling capacitors 210, relay substrate 220, first bus bar 230, second bus bar 240, third bus bar 250, first harness 260, and second harness 270. And case 280 is filled with filling resin 290.

Capacitors 210 have a configuration similar to capacitors 110 according to the first exemplary embodiment and each include capacitor body 211, first lead wire 212 having bent part 212a, and second lead wire 213 having bent part 213a.

Relay substrate 220 has a substantially quadrangular shape, and dimensions of relay substrate 220 in an up-down direction and a left-right direction are slightly smaller than inner dimensions of case 280 in the up-down direction and the left-right direction. First conductive pattern 221, second conductive pattern 222, and third conductive pattern 223 that are made of a metal foil such as a copper foil are provided on a front face of relay substrate 220.

First conductive pattern 221 extends in the up-down direction in a right end part of relay substrate 220. First conductive pattern 221 has two through-holes 221a for bus bar that are arranged side by side in the left-right direction in an upper end part and two through-holes 221b for capacitor that are provided below through-holes 221a for bus bar and arranged side by side in the up-down direction. Second conductive pattern 222 is located in an upper part of a left end part of relay substrate 220. Second conductive pattern 222 has two through-holes 222a for bus bar that are arranged side by side in the up-down direction on a left side and through-hole 222b for harness and through-hole 222c for capacitor that are arranged side by side in the up-down direction on a right side. Third conductive pattern 223 is located in a lower part of a left end part of relay substrate 220. Third conductive pattern 223 has two through-holes 223a for bus bar that are arranged side by side in the up-down direction on a left side and through-hole 223c for capacitor and through-hole 223b for harness that are arranged side by side in the up-down direction on a right side. Through-holes 221a, 222a, and 223a for bus bar, through-holes 221b, 222c, and 223c for capacitor, and through-holes 222b and 223b for harness each include a metal foil such as a copper foil or metal plating such as copper plating that covers an inner circumferential surface of the hole.

On a rear face of relay substrate 220, lands 221c, 222d, and 223d for bus bar, lands 221d, 222f, and 223f for capacitor, and lands 222e and 223e for harness that are made of a metal foil such as a copper foil are provided around through-holes 221a, 222a, and 223a for bus bar, through-holes 221b, 222c, and 223c for capacitor, and through-holes 222b and 223b for harness, respectively. Lands 221c for bus bar and lands 221d for capacitor are electrically connected to first conductive pattern 221 through through-holes 221a for bus bar and through-holes 221b for capacitor, respectively. Lands 222d for bus bar, land 222e for harness, and land 222f for capacitor are electrically connected to second conductive pattern 222 through through-holes 222a for bus bar, through-hole 222b for harness, and through-hole 222c for capacitor, respectively. Lands 223d for bus bar, land 223e for harness, and land 223f for capacitor are electrically connected to third conductive pattern 223 through through-holes 223a for bus bar, through-hole 223b for harness, and through-hole 223c for capacitor, respectively.

Relay substrate 220 has four round passage holes 224 between three conductive patterns 221, 222, and 223. Furthermore, relay substrate 220 has cutout groove 225 obtained by cutting out a central part of a lower end part of relay substrate 220 in an inverse U shape.

First bus bar 230 is formed, for example, by cutting out a conductive material such as a copper plate as appropriate and then bending the conductive material thus cut out. First bus bar 230 has, in a central part, bent part 231 that is bent upward in a rectangular shape. Two terminal pins 232 are arranged side by side in the front-rear direction on a right side in a base part of first bus bar 230, and opening 233 is provided on a left side of terminal pins 232. Furthermore, round connection terminal 234 having attachment hole 234a is provided at a front end of first bus bar 230, and engagement groove 235 recessed inward is provided on front and rear sides of a base part of connection terminal 234.

Second bus bar 240 is formed, for example, by cutting out a conductive material such as a copper plate as appropriate and then bending the conductive material thus cut out. Second bus bar 240 has, in a central part, bent part 241 that is bent backward. Two terminal pins 242 are arranged side by side in the up-down direction on a right side of a base part of second bus bar 240, and opening 243 is provided on a left side of terminal pins 242. Quadrangular connection terminal 244 having attachment hole 244a is provided in a front end part of second bus bar 240.

Third bus bar 250 is formed, for example, by cutting out a conductive material such as a copper plate as appropriate and then bending the conductive material thus cut out. Third bus bar 250 has, in a central part, bent part 251 that is bent upward after being bent forward and is bent backward after slightly extending upward. Attachment terminal 252 extending rightward is provided in a base end part of third bus bar 250. Two terminal pins 253 are arranged side by side in the up-down direction in a front end part of attachment terminal 252, and opening 254 is provided on a left side of terminal pins 253. In the base end part of third bus bar 250, first harness holder 255 and second harness holder 256 are provided on a left side and a lower side, respectively. First harness holder 255 has a U shape opened on a rear side. Second harness holder 256 has a structure such that first holding piece 256a extending straight downward and second holding piece 256b extending downward after extending forward are arranged side by side in the left-right direction. Furthermore, quadrangular connection terminal 257 having attachment hole 257a is provided in a front end part of third bus bar 250.

First harness 260 has a configuration similar to first harness 140 according to the first exemplary embodiment and includes insulation-coated conductive wire 261 (hereinafter abbreviated as "conductive wire 261"), round crimp terminal 262, and protection tube 263. Similarly, second harness 270 includes insulation-coated conductive wire 271 (hereinafter abbreviated as "conductive wire 271"), round crimp terminal 272, and protection tube 273. Furthermore, second harness 270 is configured such that a part of conductive wire 271 that is held by first harness holder 255 and second harness holder 256 is covered with heat-shrinkable tube 274 made of rubber in order to prevent conductive wire 271 from being damaged by harness holders 255 and 256. A length of second harness 270 is shorter than a length of first harness 260.

Case 280 is made of a resin material such as PPS and includes case body 281 that has a box shape opened on an upper side, first attachment tab 282 provided on a left side of case body 281, and second attachment tab 283 provided on a right side of case body 281. Case body 281 has a substantially L shape in plan view.

On an inner side of case body 281, first substrate holder 285 and second substrate holder 286 are provided on right end parts of front face 281a and rear face 281b, respectively. First substrate holder 285 and second substrate holder 286 have first insertion groove 285a and second insertion groove 286a extending in the up-down direction, respectively. A groove width of each of first insertion groove 285a and second insertion groove 286a is almost equal to a thickness of relay substrate 220. Furthermore, first engagement recess 287 and second engagement recess 288 that are slightly recessed are provided on a right side and a left side on an upper end of rear face 281b. A width of first engagement recess 287 is almost equal to a width of bent part 241 of second bus bar 240, and a width of second engagement recess 288 is almost equal to a width of bent part 251 of third bus bar 250. Furthermore, harness holder 289 is provided in a right rear end part of case body 281. Harness holder 289 is configured such that a right rear end part of case body 281 is expanded rightward to create accommodating space 289a that accommodates first harness 260 and part of an inlet to accommodating space 289a is closed by closing rib 289b extending in the up-down direction. Furthermore, position determining pin 281c that protrudes downward is provided on an external bottom face of case body 281.

First attachment tab 282 has round attachment hole 282a. Collar 284 made of a metal is fitted in attachment hole 282a in order to increase a strength of the hole. On an upper face of first attachment tab 282, engagement rib 282b that protrudes upward is provided in a front end part and a rear end part on a right side of attachment hole 282a.

Second attachment tab 283 has round attachment hole 283a. Collar 284 is fitted in attachment hole 283a as in the case of attachment hole 282a. Position determining pin 283b that protrudes downward is provided on a lower face of second attachment tab 283 on a front side of attachment hole 283a.

Filling resin 290 is a thermosetting resin and is, for example, an epoxy resin. Alternatively, filling resin 290 may be a urethane resin. As illustrated in FIG. 9, filling resin 290 covers main portions of assembly body A2, thereby protecting these main portions from external moisture and shock.

In a case where capacitor module 2 is assembled, first, assembly body A2 is assembled as illustrated in FIG. 10 by attaching two capacitors 210, first bus bar 230, second bus bar 240, third bus bar 250, first harness 260, and second harness 270 to relay substrate 220. In this process, one of capacitors 210 is soldered to first conductive pattern 221 after inserting first lead wire 212 into upper through-hole 221b for capacitor of first conductive pattern 221 to a position where first lead wire 212 is stopped by bent part 212a. Further, the one of capacitors 210 is soldered to second conductive pattern 222 after inserting second lead wire 213 into through-hole 222c for capacitor of second conductive pattern 222 to a position where second lead wire 213 is stopped by bent part 213a. Furthermore, the other one of capacitors 210 is soldered to first conductive pattern 221 after inserting first lead wire 212 into lower through-hole 221b for capacitor of first conductive pattern 221 to a position where first lead wire 212 is stopped by bent part 212a. Further, the other one of capacitors 210 is soldered to third conductive pattern 223 after inserting second lead wire 213 into through-hole 223c for capacitor of third conductive pattern 223 to a position where second lead wire 213 is stopped by bent part 213a. Furthermore, first bus bar 230 is soldered to first conductive pattern 221 after inserting two terminal pins 232 into two through-holes 221a for bus bar of first conductive pattern 221. Furthermore, second bus bar 240 is soldered to second conductive pattern 222 after inserting two terminal pins 242 into two through-holes 222a for bus bar of second conductive pattern 222. Furthermore, third bus bar 250 is soldered to third conductive pattern 223 after inserting two terminal pins 253 into two through-holes 223a for bus bar of third conductive pattern 223. Furthermore, first harness 260 is soldered to second conductive pattern 222 after inserting an end of conductive wire 261 into through-hole 222b for harness of second conductive pattern 222. Furthermore, second harness 270 is soldered to third conductive pattern 223 after inserting an end of conductive wire 271 into through-hole 223b for harness of third conductive pattern 223.

In this way, first lead wire 212 of one capacitor 210 and first lead wire 212 of other capacitor 210 are electrically connected to first bus bar 230 through first conductive pattern 221. Furthermore, second lead wire 213 of one capacitor 210 is electrically connected to second bus bar 240 and first harness 260 through second conductive pattern 222, and second lead wire 213 of other capacitor 210 is electrically connected to third bus bar 250 and second harness 270 through third conductive pattern 223.

As illustrated in FIG. 10, first harness 260 is drawn around two capacitors 210, passed through cutout groove 225 of relay substrate 220, and then drawn out to a right side of relay substrate 220. Second harness 270 is held by second harness holder 256 so as to be sandwiched between first holding piece 256a and second holding piece 256b after extending leftward from relay substrate 220. Second harness 270 is further bent upward and is held by first harness holder 255 so as to be fitted in the U-shaped part. In this way, a position of second harness 270 relative to third bus bar 250 is determined by being held by first harness holder 255 and second harness holder 256.

Assembled assembly body A2 is inserted from above into case 280. In this process, a right end of relay substrate 220 is inserted into first insertion groove 285a of first substrate holder 285, and a left end of relay substrate 220 is inserted into second insertion groove 286a of second substrate holder 286, as illustrated in FIG. 15. This determines a position of relay substrate 220 relative to case 280, and relay substrate 220 is held in this state so as not to move in the front-rear direction and the left-right direction. Relay substrate 220 is stretched between front face 281a and rear face 281b of case 280 and is contained in case 280 in a standing state.

Two engagement grooves 235 of first bus bar 230 are engaged with corresponding engagement ribs 282b of first attachment tab 282, respectively. This determines a position of first bus bar 230 relative to case 280, and first bus bar 230 is held in this state so as not to move in the front-rear direction and the left-right direction. Attachment hole 234a of connection terminal 234 of first bus bar 230 is aligned with attachment hole 282a of first attachment tab 282.

Furthermore, bent parts 241 and 251 of second bus bar 240 and third bus bar 250 are engaged with first engagement recess 287 and second engagement recess 288, respectively. This determines positions of second bus bar 240 and third bus bar 250 relative to case 280, and second bus bar 240 and third bus bar 250 are held in this state so as not to move in a left-right direction. Furthermore, first harness 260 is erected so as to be contained in accommodating space 289a of harness holder 289. This determines a position of first harness 260 relative to case 280, and first harness 260 is held in this state so as not to move in the front-rear direction and the left-right direction.

Second bus bar 240 is drawn out upward from case 280 at a position of first engagement recess 287, and third bus bar 250 is drawn out upward from case 280 at a position of second engagement recess 288. First harness 260 is drawn out upward from case 280 at a position of harness holder 289, and second harness 270 is drawn out upward from case 280 at a position of first harness holder 255 of third bus bar 250.

When assembly body A2 is put into case 280, filling resin 290 in a liquid form is poured into case 280. Filling resin 290 is poured into case 280 until two capacitors 210 and relay substrate 220 are immersed in filling resin 290. In this process, filling resin 290 poured into case 280 is easily delivered to a space between relay substrate 220 and right face 281d of case 280 through four passage holes 224 and cutout groove 225 of relay substrate 220. Furthermore, poured filling resin 290 is easily delivered to a part below first bus bar 230 through opening 233 of first bus bar 230. Furthermore, poured filling resin 290 is easily delivered to a part behind second bus bar 240 and a part behind third bus bar 250 through opening 243 of second bus bar 240 and opening 254 of third bus bar 250.

After case 280 is filled with filling resin 290, case 280 is heated. This cures filling resin 290 in liquid form. Capacitor module 2 is completed in this way. In case 280, assembly body A2 is fixed by cured filling resin 290 and does not come out from case 280 upward.

Capacitor module 2 is also mounted in an apparatus, a vehicle, or the like as in the case of capacitor module 1 according to the first exemplary embodiment. When capacitor module 2 is mounted in an apparatus, a vehicle, or the like, capacitor module 2 is, for example, attached to attachment member 300 prepared on the apparatus, the vehicle, or the like as illustrated in FIG. 16. Attachment member 300 is made of a metal such as aluminum and has first attachment boss 301 and second attachment boss 302. Capacitor module 2 is fixed to attachment member 300 by attaching first attachment tab 282 to first attachment boss 301 by using screw 303 and attaching second attachment tab 283 to second attachment boss 302 by using screw 304. In this process, position determining pin 281c on an external bottom face of case 280 is inserted into position determining hole 300a of attachment member 300, and position determining pin 283b of second attachment tab 283 is inserted into position determining hole 302a of second attachment boss 302, and thus capacitor module 2 is fixed to attachment member 300 in a proper direction.

First bus bar 230 is electrically connected to first attachment boss 301 through screw 303. Meanwhile, round crimp terminals 262 and 272 of first harness 260 and second harness 270 are electrically connected to connection terminals 311 and 312 of an electric circuit part such as an inverter circuit or a power source circuit that is disposed separately from attachment member 300. Furthermore, second bus bar 240 and third bus bar 250 are electrically connected to harnesses 313, 314 drawn out from the electric circuit part.

Effects of Second Exemplary Embodiment

The second exemplary embodiment described above achieves the following effects.

As in the first exemplary embodiment, it is possible to electrically connect lead wire (lead terminal) type capacitors 210 to a connector such as an external connection terminal by using first bus bar 230, second bus bar 240 (third bus bar 250), and first harness 260 (second harness 270) while suppressing damage caused by heat.

As in the first exemplary embodiment, it is possible to smoothly connect first bus bar 230, second bus bar 240 (third bus bar 250), and first harness 260 (second harness 270) to a connector such as a connection terminal provided in a place where capacitor module 2 is installed. Furthermore, it is possible to prevent first bus bar 230, second bus bar 240 (third bus bar 250), and first harness 260 (second harness 270) from interfering with other components provided in the place. In particular, since third bus bar 250 has first harness holder 255 and second harness holder 256 and second harness 270 is held by harness holders 255 and 256, a position of second harness 270 is determined relative to third bus bar 250, and it is therefore possible to precisely draw second harness 270 from a determined position of case 280 as in the case of first harness 260 and the like even in a case where a structure for determining the position of second harness 270 is not provided in case 280.

As in the first exemplary embodiment, passage holes 224 formed in relay substrate 220 allow filling resin 290 poured into one of spaces of case 280 partitioned by relay substrate 220 to be smoothly delivered to the other space.

Since relay substrate 220 allows a plurality of connection terminal members, i.e., second bus bar 240 (third bus bar 250) and first harness 260 (second harness 270) to be electrically connected to second lead wire 213 of capacitor 210, i.e., to a single lead wire, one electrode side of capacitor 210 can be connected to a plurality of connectors such as external connection terminals by using the plurality of connection terminal members.

Variations

Although the exemplary embodiments of the present disclosure have been described above, the present disclosure is not limited to the exemplary embodiments described above, and moreover, a variety of modifications can be applied to application examples according to the present disclosure besides the exemplary embodiments described above.

For example, in the first and second exemplary embodiments, capacitor modules 1, 2 include two capacitors 110, 210, respectively. However, a number of capacitors 110, 210 provided in capacitor modules 1, 2 is not limited.

In the first exemplary embodiment, bus bar 130 may be replaced with a harness, and first harness 140 and second harness 150 may be replaced with bus bars. In the second exemplary embodiment, first bus bar 230 may be replaced with a harness, the set of second bus bar 240 and first harness 260 and the set of third bus bar 250 and second harness 270 may be replaced with a set of two bus bars or a set of two harnesses. As described above, connection terminal members connected to capacitors 110, 210 through relay substrates 120, 220 may be changed as appropriate.

In the first and second exemplary embodiments, inner circumferential surfaces of through-holes such as through-holes 121a and 221a for bus bar of relay substrates 120, 220 are covered with a metal foil or metal plating such as copper plating, and lands such as lands 121c and 221c for bus bar are provided on the rear faces of relay substrates 120, 220. According to such a configuration, capacitors 110, 210 can be firmly fixed to relay substrates 120, 220 by soldering. However, through-holes need not necessarily be covered with a metal foil or metal plating such as copper plating, and lands need not necessarily be provided on the rear faces of relay substrates 120, 220.

Furthermore, a structure for determining a positions of a connection terminal member such as a bus bar and a harness relative to the case is not limited to the structures used in the first and second exemplary embodiments and can be any structure.

Furthermore, capacitors 110, 210 can be capacitors other than film capacitors, for example, electrolytic capacitors.

In addition, various modifications can be made to the exemplary embodiments of the present disclosure as appropriate within the scope of the technical idea disclosed in the claims.

It should be noted that, in the description of the above-described exemplary embodiments, a term indicating a direction, such as "upward" or "downward", indicates a relative direction that only depends on a relative positional relationship of constituent members, and does not indicate an absolute direction, such as a vertical direction or a horizontal direction.

The present disclosure is effective for capacitors used for various electric components of electronic devices, electrical devices, industrial devices, and vehicles, for example.

What is claimed is:

1. A capacitor module comprising:
    a capacitor that includes a capacitor body, a first lead wire, and a second lead wire, the first lead wire and the second lead wire being drawn out from the capacitor body;
    a relay substrate on which a first conductive pattern and a second conductive pattern are disposed, the first conductive pattern being electrically connected with the first lead wire, the second conductive pattern being electrically connected with the second lead wire;
    a first connection terminal member that is electrically connected to the first conductive pattern, the first connection terminal member including a first terminal part configured to be electrically connected to an external connector;
    a second connection terminal member that is electrically connected to the second conductive pattern, the second connection terminal member including a second terminal part configured to be electrically connected to an external connector; and
    a case into which an assembly body is put, the assembly body being obtained by assembling the capacitor, the relay substrate, the first connection terminal member, and the second connection terminal member, the case including a fixing part configured to be fixed to a place where the capacitor module is to be installed, wherein:
    the case includes a substrate position determiner, a first terminal position determiner, and a second terminal position determiner, the substrate position determiner positioning the relay substrate with respect to the case, the first terminal position determiner positioning the first connection terminal member with respect to the case, the second terminal position determiner positioning the second connection terminal member with respect to the case,
    the second connection terminal member includes a harness,
    the case has a quadrangular bottom face and four side faces, the four side faces rising from the bottom face,
    the relay substrate is disposed in the case so as to stand on the bottom face, and
    the second terminal position determiner is provided on one side face among the four side faces, the one side face facing the relay substrate, the second terminal position determiner including a structure sandwiching the harness so as to regulate movement along the one side face.

2. The capacitor module according to claim 1, wherein the first connection terminal member includes a bus bar.

3. The capacitor module according to claim 1, wherein:
    the harness is electrically connected to the second conductive pattern on a face of the relay substrate that does not face the second terminal position determiner, and
    the relay substrate has a through-port through which the harness extending from the second conductive pattern to the second terminal position determiner passes.

4. The capacitor module according to claim 1, further comprising a filling resin with which the case is filled,
    wherein the relay substrate has a passage hole through which the filling resin passes.

5. The capacitor module according to claim 1, further comprising a third connection terminal member that is electrically connected to the second conductive pattern, the third connection terminal member including a third terminal part configured to be electrically connected to an external connector.

6. The capacitor module according to claim 5, further comprising a case into which an assembly body is put, the assembly body being obtained by assembling the capacitor, the relay substrate, the first connection terminal member, the second connection terminal member, and the third connection terminal member, the case including a fixing part configured to be fixed to a place where the capacitor module is to be installed, wherein:
    the second connection terminal member includes a bus bar,
    the third connection terminal member includes a harness,
    the case includes a substrate position determiner, a first terminal position determiner, and a second terminal position determiner, the substrate position determiner positioning the relay substrate with respect to the case, the first terminal position determiner positioning the first connection terminal member with respect to the case, the second terminal position determiner positioning the bus bar with respect to the case, and
    the bus bar includes a third terminal position determiner positioning the harness with respect to the bus bar.

7. A capacitor module comprising:
    a capacitor that includes a capacitor body and a lead wire, the lead wire being drawn out from the capacitor body;
    a relay substrate on which a conductive pattern is disposed, the conductive pattern being electrically connected with the lead wire;
    a connection terminal member that is electrically connected to the conductive pattern, the connection terminal member including a harness and a terminal part configured to be electrically connected to an external connector; and
    a case into which an assembly body is put, the assembly body being obtained by assembling the capacitor, the relay substrate, and the connection terminal member, the case including a fixing part configured to be fixed to a place where the capacitor module is to be installed, wherein:
    the case includes a substrate position determiner and a terminal position determiner, the substrate position determiner positioning the relay substrate with respect to the case, the terminal position determiner positioning the connection terminal member with respect to the case,
    the case has a quadrangular bottom face and a side face, the side face rising from the bottom face,
    the relay substrate is disposed in the case so as to stand on the bottom face, and
    the terminal position determiner is provided on the side face, the terminal position determiner including a structure sandwiching the harness so as to regulate movement along the side face.

8. The capacitor module according to claim 7, wherein:
    the harness is electrically connected to the conductive pattern on a face of the relay substrate that does not face the terminal position determiner, and
    the relay substrate has a through-port through which the harness extending from the conductive pattern to the terminal position determiner passes.

9. The capacitor module according to claim 7, further comprising a filling resin with which the case is filled,
    wherein the relay substrate has a passage hole through which the filling resin passes.

* * * * *